(12) United States Patent
Ryu et al.

(10) Patent No.: US 9,778,816 B2
(45) Date of Patent: Oct. 3, 2017

(54) METHOD OF AND DEVICE FOR MANAGING APPLICATIONS

(71) Applicant: SAMSUNG ELECTRONICS CO.. LTD, Suwon-si (KR)

(72) Inventors: Jong-hyun Ryu, Daejeon (KR); Yong-gook Park, Yongin-si (KR); Jang-woo Lee, Seoul (KR); Jae-young Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 176 days.

(21) Appl. No.: 14/164,843

(22) Filed: Jan. 27, 2014

(65) Prior Publication Data
US 2014/0215366 A1 Jul. 31, 2014

(30) Foreign Application Priority Data

Jan. 31, 2013 (KR) .................. 10-2013-0011490
Jul. 18, 2013 (KR) .................. 10-2013-0084930

(51) Int. Cl.
| | |
|---|---|
| *G06F 3/0484* | (2013.01) |
| *G06F 3/0481* | (2013.01) |
| *G06F 11/34* | (2006.01) |
| *G06F 9/445* | (2006.01) |
| G06F 3/048 | (2013.01) |

(52) U.S. Cl.
CPC ............ *G06F 3/04817* (2013.01); *G06F 8/62* (2013.01); *G06F 11/3438* (2013.01); *G06F 2201/865* (2013.01); *G06F 2201/88* (2013.01)

(58) Field of Classification Search
CPC ...... G06F 3/0484; G06F 3/04817; G06F 8/62; G06F 11/3438; G06F 2201/88; G06F 2201/865; G06F 3/048
See application file for complete search history.

(56) References Cited

U.S. PATENT DOCUMENTS

| | | | |
|---|---|---|---|
| 6,496,979 B1 * | 12/2002 | Chen .................. | G06F 8/61 717/178 |
| 2006/0048139 A1 | 3/2006 | Nakamura | |
| 2006/0095864 A1 | 5/2006 | Mock et al. | |
| 2008/0051076 A1 | 2/2008 | O'Shaughnessy et al. | |

(Continued)

FOREIGN PATENT DOCUMENTS

| | | |
|---|---|---|
| EP | 1182554 A2 | 2/2002 |
| KR | 10-2012-0057871 A | 6/2012 |

(Continued)

OTHER PUBLICATIONS

International Search Report for PCT/KR2014/000605 dated May 14, 2014 [PCT/ISA/210].

(Continued)

*Primary Examiner* — Jeanette J Parker
(74) *Attorney, Agent, or Firm* — Sughrue Mion, PLLC

(57) ABSTRACT

Provided are a method of and device for managing applications installed on the device. The device includes: a user interface configured to display the plurality of applications; and a controller configured to monitor use history of each of the plurality of applications, and control the user interface to change a visual representation of at least one application from among the plurality of applications based on the monitored use history.

14 Claims, 19 Drawing Sheets

(56) References Cited

U.S. PATENT DOCUMENTS

| | | |
|---|---|---|
| 2009/0041230 A1 | 2/2009 | Williams |
| 2010/0107150 A1* | 4/2010 | Kamada .................... G06F 8/65 717/170 |
| 2011/0061010 A1 | 3/2011 | Wasko |
| 2011/0306326 A1 | 12/2011 | Reed et al. |
| 2012/0079418 A1 | 3/2012 | Lindsay et al. |
| 2012/0117504 A1 | 5/2012 | Lemay et al. |
| 2012/0129503 A1 | 5/2012 | Lindeman et al. |
| 2012/0260118 A1 | 10/2012 | Jiang et al. |
| 2013/0007662 A1 | 1/2013 | Bank et al. |
| 2013/0166517 A1* | 6/2013 | Saliba ............... G06F 17/30371 707/691 |
| 2013/0185373 A1 | 7/2013 | Vandwalle et al. |
| 2013/0198506 A1* | 8/2013 | Smith .................. G06F 1/1684 713/100 |
| 2014/0201681 A1* | 7/2014 | Mahaffey .......... H04M 1/72569 715/846 |

FOREIGN PATENT DOCUMENTS

| | | |
|---|---|---|
| KR | 10-1291123 B1 | 8/2013 |
| RU | 2237275 C2 | 9/2004 |
| RU | 2336553 C2 | 10/2008 |

OTHER PUBLICATIONS

Written Opinion for PCT/KR2014/000605 dated May 14, 2014 [PCT/ISA/237].

Notification of Transmittal of International Search Report and Written Opinion for PCT/KR2014/000605 dated May 14, 2014 [PCT/ISA/220].

Communication from the European Patent Office issued Apr. 25, 2014 in a counterpart European Application No. 14153127.7.

Communication dated Nov. 30, 2016, issued by the Russian Patent Office in counterpart Russian Application No. 2015136859/08.

Communication dated May 3, 2016, issued by the European Patent Office in counterpart European Patent Application No. 14153127.7.

* cited by examiner

FIG. 3

| | USE FREQUENCY DURING THRESHOLD TIME | UNUSED NUMBER OF TIMES AT CERTAIN POINT OF TIME | AVERAGE USE | UNINSTALL LEVEL | USED LOCATION | CONNECTION FREQUENCY TO ANOTHER DEVICE | ... |
|---|---|---|---|---|---|---|---|
| FIRST APPLICATION | 0 TIMES | 4 TIMES | 0 hour | 2 | | | ... |
| SECOND APPLICATION | 2 TIMES | 1 TIME | 0.2 hour | 1 | GANGNAM | | ... |
| THIRD APPLICATION | 38 TIMES | 0 TIMES | 3.2 hour | 0 | | | ... |
| FOURTH APPLICATION | 0 TIMES | 0 TIMES | 0 hour | 1 | | 0 TIMES | ... |
| ... | | | | ... | ... | ... | |

FIG. 5

| | | DEVICE | SERVER/CLOUD |
|---|---|---|---|
| FIRST UNINSTALL LEVEL | APP | ICON, EXECUTION FILE, APP METADATA(APP TITLE, APP VERSION, APP INSTALLATION MARKET LINK), USER DATA(LOGIN ID/PASSWD, SESSION INFORMATION), APP DATA, (CONFIGURATION DATA, DATA REQUIRED WHILE USING APP, LOG/TRANSACTION/HISTORY) | NONE |
| | CONTENT | ORIGINAL CONTENT | NONE |
| | SERVICE | ICON, SERVICE LINK, USER DATA(LOGIN ID ID/PASSWD, SESSION INFORMATION) | NONE |
| SECOND UNINSTALL LEVEL | APP | ICON, APP METADATA(APP TITLE, APP VERSION, APP INSTALLATION MARKET LINK), SERVER BACKUP DATA LINK | USER DATA(LOGIN ID/PASSWD, SESSION INFORMATION), APP DATA(CONFIGURATION DATA, DATA REQUIRED WHILE USING APP, LOG/TRANSACTION/HISTORY) |
| | CONTENT | CONTENT THUMBNAIL(PHOTO, IMAGE, MOVIE ETC), CONTENT SUMMARY(TEXT, WEB PAGE, PDF/DOC ETC), SERVER BACKUP DATA LINK | ORIGINAL CONTENT |
| | SERVICE | ICON, SERVICE LINK SERVER BACKUP DATA LINK | USER DATA(LOGIN ID/PASSWD, SESSION INFORMATION) |
| THIRD UNINSTALL LEVEL | APP | NONE | NONE |
| | CONTENT | NONE | NONE |
| | SERVICE | NONE | NONE |

METHOD OF AND DEVICE FOR MANAGING APPLICATIONS

CROSS REFERENCE TO RELATED APPLICATIONS

This application claims priority from Korean Patent Application No. 10-2013-0011490, filed in the Korean Intellectual Property Office on Jan. 31, 2013, and Korean Patent Application No. 10-2013-0084930, filed in the Korean Intellectual Property Office on Jul. 18, 2013, the disclosures of which are incorporated herein by reference in their entireties.

BACKGROUND

1. Field

Methods, and apparatuses consistent with exemplary embodiments relate to managing applications.

2. Description of the Related Art

Mobile (portable) devices, such as smart phones, tablet devices, and personal digital assistants (PDAs), are in wide use worldwide. Like in the case of other devices, such as personal computers (PCs) and laptops, the users may directly install various types of applications on the mobile devices. Accordingly, the users may be able to perform various operations, for example, they may watch content, such as a moving images or a picture, manage a personal schedule, write an email, play a game, etc. However, because the storage capacity of these devices is limited, the number of applications that can be installed is limited as well. Also, if many applications are installed, it may be difficult to find and delete select applications one by one. Thus, a method of efficiently managing applications in a mobile device may be implemented.

SUMMARY

One or more exemplary embodiments provide a method of and device for of managing applications and a device for managing applications. Also, one or more exemplary embodiments provide a computer-readable recording medium having recorded thereon the method.

According to an aspect of an exemplary embodiment, there is provided a device having a plurality of applications installed thereon, the device including a user interface configured to display the plurality of applications, and a controller configured to monitor use history of each of the plurality of applications, and control the user interface to change a visual representation of at least one application from among the plurality of applications based on the monitored use history.

The controller may be further configured to change the visual representation of the at least one application displayed by the user interface by overlapping a layer of an object representing the at least one application with a layer of another object.

The controller may be further configured to change the visual representation of the at least one application displayed by the user interface by changing an object representing the at least one application.

the controller may be further configured to control the user interface to change the visual representation to identify a management state of the at least one application from among the plurality of applications.

The controller may include a determiner configured to determine at least one application, from among the plurality of applications, whose monitored use history satisfies a pre-set display change condition, and an uninstaller configured to change the visual representation of the determined at least one application.

The pre-set display change condition may include detailed conditions of a plurality of levels that are classified based on a degree of not using an application, and the controller may be further configured to control the user interface to change the visual representation of the determined at least one application by determining a detailed condition of a level, from among the detailed conditions of the plurality of levels, is satisfied by the monitored use history.

The controller may be further configured to control the user interface to change the determined at least one application to different types of visual representations according to the plurality of levels.

The controller may be configured to determine the at least one application by applying different types of display change conditions according to attributes of the plurality of applications.

The attributes of the plurality of applications may be classified according to at least one of capacities of the plurality of applications, update frequencies of the plurality of applications, memory resource capacities occupied by the plurality of applications, and types of the plurality of applications.

The controller may be further configured to control the user interface to change the visual representation of the at least one application by displaying a predetermined symbol overlapped on an object representing the at least one application.

The user interface may be configured to change the visual representation of the at least one application by displaying an additional layer showing a predetermined visual effect and overlapped on an object representing the at least one application.

The additional layer may include at least one of a layer for differently showing a color, a brightness, a chroma of the object, a luma of the object, a layer for showing the object as dark, a layer for showing the object as foggy, a layer for showing the object in a grayscale, a layer for showing dotted lines on a boundary of the object, a layer for showing the object as visually concave, a layer for showing the object as visually convex, and a layer for showing the object as shabby.

The controller may be further configured to determine, based on the monitored use history, at least one of an application that has not been used for a predetermined threshold time, an application that is not used repeatedly a threshold number of times until a predetermined point of time, an application that is not used when a location of the device is outside a range of a predetermined place, and an application that has not been commonly used with another device for a threshold time, and change the visual representation of the determined at least one application.

The controller may further include an uninstaller configured to delete user data that is stored in the device while the at least one application is used, and backing up the stored user data in a server, with respect to the at least one application.

According to an aspect of another exemplary embodiment, there is provided a method of managing a plurality of applications installed on a device, the method including displaying the plurality of applications through a user interface, monitoring a use history of each of the plurality of applications, and controlling the user interface to change a visual representation of at least one application based on the monitored use history.

The controlling the user interface may include controlling the user interface such that a layer of an object representing the at least one application is displayed as overlapping below a layer of another object, or such that the object representing the at least one application itself is changed.

The controlling the user interface may include determining an application from the plurality of applications whose monitored use history satisfies a pre-set display change condition, and changing the visual representation of the determined application.

The pre-set display change condition may include detailed conditions of a plurality of levels that are classified based on a degree of not using an application, and the controlling the user interface includes changing the visual representation of the determined at least one application by determining whether the monitored use history satisfies a detailed condition of which level from among the detailed conditions.

The controlling the user interface may include changing the determined at least one application to different types of visual representations according to the plurality of levels.

The controlling the user interface may include changing the visual representation of the at least one application by displaying at least one of a predetermined symbol and an additional layer for showing a predetermined visual effect, the additional layer being overlapped on an object representing the at least one application.

BRIEF DESCRIPTION OF THE DRAWINGS

The above and/or other aspects will become apparent and more readily appreciated from the following description of the exemplary embodiments, taken in conjunction with the accompanying drawings in which:

FIG. 3 is a table showing a result of a monitor monitoring use histories of applications installed on a device, according to an exemplary embodiment;

FIG. 5 is a table for describing uninstall operations performed at each uninstall level, according to an exemplary embodiment;

DETAILED DESCRIPTION

Figure 1A:
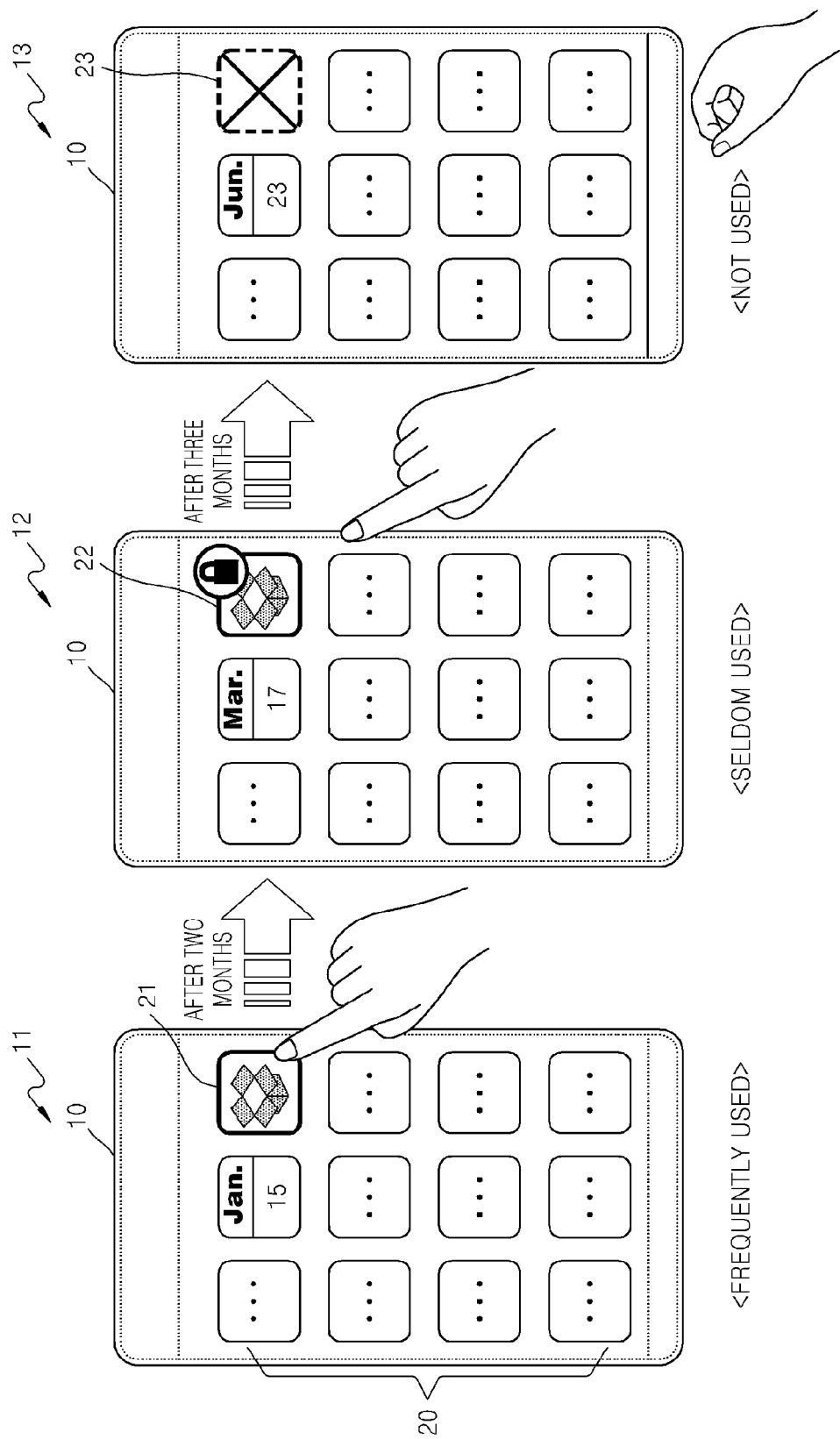
FIGS. 1A and 1B are diagrams showing use patterns of a user using applications installed on a device, according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

Particular exemplary embodiments will be illustrated in the drawings and described in detail in the written description. However, this is not intended to limit the present exemplary embodiments to particular modes of practice, and it will to be appreciated that all changes, equivalents, and substitutes that do not depart from the spirit and technical scope are encompassed. In the description, certain detailed explanations of related art are omitted when it is deemed that they may unnecessarily obscure the essence of the one or more exemplary embodiments.

As used herein, the term "and/or" includes any and all combinations of one or more of the associated listed items. Expressions such as "at least one of," when preceding a list of elements, modify the entire list of elements and do not modify the individual elements of the list.

While such terms as "first," "second," etc., may be used to describe various components, such components must not be limited by the above terms. The above terms are used only to distinguish one component from another.

All terms including descriptive or technical terms which are used herein should be construed as having meanings that are known to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

A "device" mentioned throughout one or more exemplary embodiments may be a smart phone, a mobile phone, a personal digital assistant (PDA), a laptop, a media player, a global positioning system (GPS), or another mobile or non-mobile computing device, but is not limited thereto. It will be readily understood by one of ordinary skill in the art that the device may alternatively be any one of various devices capable of receiving a touch input, such as an electronic blackboard or a touch table.

Information inputtable to a device according to one or more exemplary embodiments includes user input information, and for example, may be touch-based user input information. The touch-based user input information may be a request of the user, a selection of the user, such as selection of one piece of application-related information being displayed, or a command of the user, such as a delete command based on application-related information being displayed, but is not limited thereto.

A touch-based input may be dependent on a touch-based gesture of a user. Examples of the touch-based gesture include tap (or touch), long tap (or long touch), touch and hold, touch and drag, double tap, drag, panning, flick, drag and drop, and sweep, but are not limited thereto.

An input is not limited to the touch-based gesture. For example, the input may be motion-based or vision-based.

A motion-based input may be based on a gesture of a user based on moving a device, for example, shaking or hitting the device. For example, a gesture of tilting the device to a location where a virtual space that will be described later is displayed or of hitting the device twice may be set as an input for requesting to register selected application-related information in the virtual space.

A vision-based input may be based on a gesture of a user recognized by analyzing an input image obtained by using a camera, without having to contact a device. For example, a space gesture of making a V sign by using an index finger and a middle finger may be set as an input for requesting to delete application-related information in a virtual space that will be described later.

One or more exemplary embodiments will now be described in detail with reference to accompanying drawings.

Figure 1B:
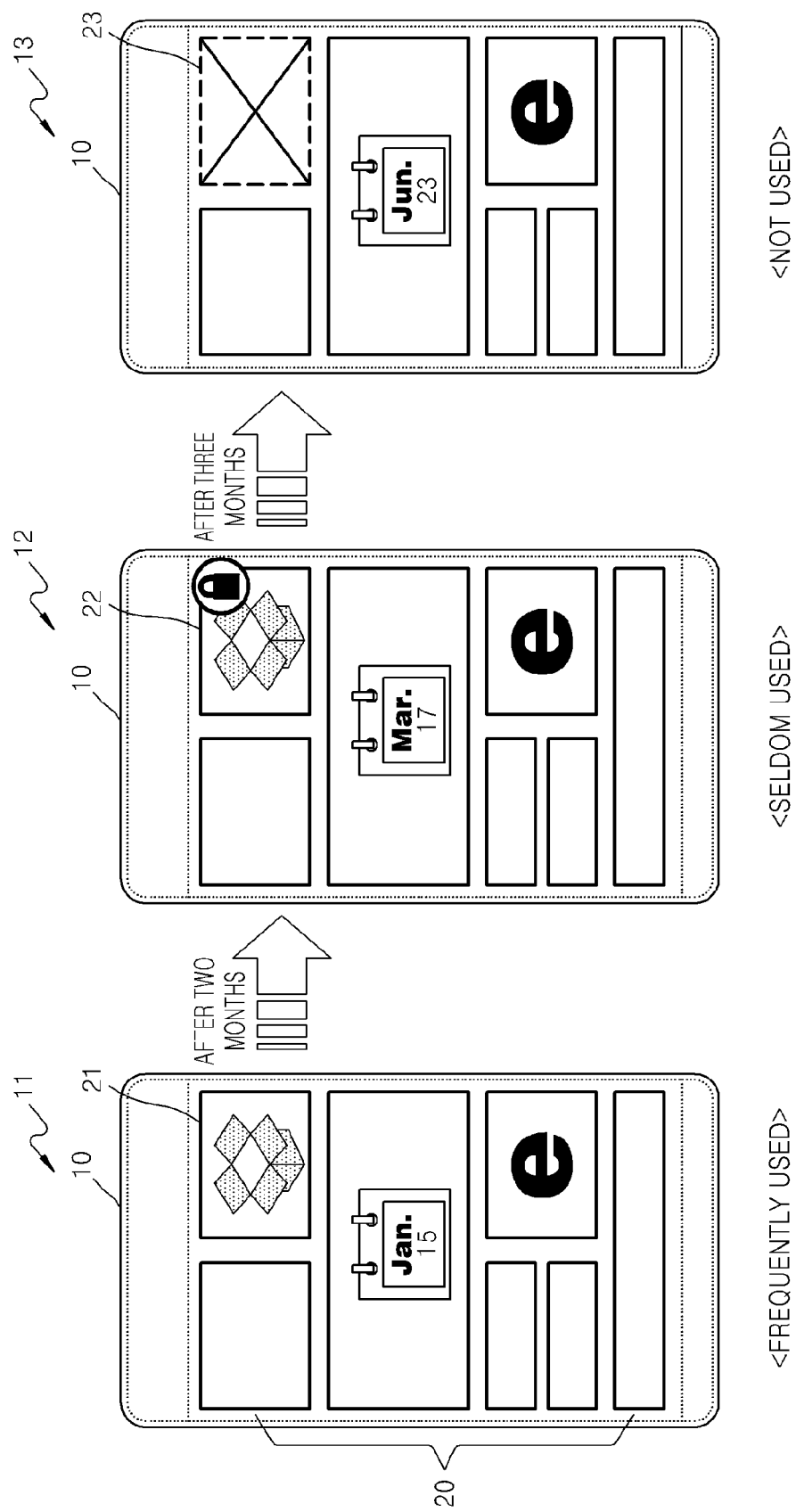

FIGS. 1A and 1B are diagrams showing use patterns of a user using applications 20 installed on a device 10, according to an exemplary embodiment.

Referring to FIG. 1A, use patterns of the user on a date 11 dated January 15, a date 12 dated March 17th, and a date 13 dated June 23rd are described, but these dates are only examples and are not limited thereto. Also, user interfaces (UIs) shown in FIG. 1B are in slightly different tile shapes from UIs in FIG. 1A, and thus descriptions on FIG. 1A may also apply to FIG. 1B. In other words, various UIs of the device 10 may exist other than those shown in FIG. 1A, and one or more exemplary embodiments may include various UIs.

Various types of the applications 20 may be pre-installed on the device 10 or are installed by the user. Also, a list of the applications 20 may be displayed on the UI of the device 10.

In one or more exemplary embodiments, the applications 20 denote a series of computer program (software) groups designed to perform certain operations. Accordingly, since one of ordinary skill in the art will readily understand that examples of the applications 20 described herein include a game application, a utility application, a musical instrument playing application, a moving image reproducing application, a map application, a broadcast application, an exercise supporting application, a payment application, etc., details thereof will be omitted herein.

Referring to FIG. 1A, based on the use pattern on the date 11 dated January fifteenth, it may be assumed that a first application 21 from among the applications 20 installed on the device 10 is frequently used.

However, based on the use pattern on the date 12 dated March 17th that is two months after the date 11 dated January 15th, it is assumed that a first application 22 is seldom used compared to the first application 21.

Moreover, based on the use pattern on the date 13 dated June 23rd that is three month after the date 12 dated March 17th, it is assumed that a first application 23 is not used at all.

As such, an application from among the applications 20 installed on the device 10 may be initially frequently used but gradually used less and less as the user's interest fades away, like the first application 21.

General devices, such as smart phones and mobile phones, only manage installation of applications, and do not separately manage how the applications are used or which applications are currently not used or seldom used.

In detail, according to an increase in types of applications directly installable on devices, such as smart phones and mobile phones, it may be difficult for the user to manage the applications simultaneously. Also, because storage capacities of the devices are limited, if many applications are installed, the storage capacities may not be sufficient to additionally store other information. Moreover, if the user wants to delete applications that are no longer used or unnecessary, it may be inconvenient for the user to delete the applications one by one.

According to the current embodiment, the device 10 may have a function of monitoring and separately managing the first application 21 that is seldom used or not used, unlike other applications 20. In detail, according to the current exemplary embodiment, the device 10 has a function of performing operations for managing the first application 21 in stages, for example, uninstall operations.

For example, as described above, the first application 21 is frequently used on the date 11 dated January 15th, but the first application 22 is seldom used on the date 12 dated March 17th that is two months after the date 11 dated January 15th.

The device 10 monitors a use history of the user on the first application 21 or 22 between the date 11 dated January 15th and the date 12 dated March 17th. If it is monitored that the first application 22 is not frequently used on the date 12 dated March 17th, the device 10 performs an uninstall operation corresponding to a certain uninstall level on the first application 22, and displays identification information indicating that the first application 22 is at the certain uninstall level.

Here, in order to indicate that the first application 22 is at the certain uninstall level on the date 11 dated March 17th, the device 10 may insert and display a padlock symbol on an icon of the first application 22. Accordingly, the user may immediately recognize that the first application 22 is not frequently used.

Then, the device 10 monitors the use pattern of the user on the first application 22 or 23 between the date 12 dated March 17th and the date 13 dated June 23rd. If it is monitored that the first application 23 is no longer used on the date 13 dated June 23rd, the device 10 may perform an uninstall operation corresponding to another uninstall level higher than the certain uninstall level on the date 12 dated March 17th on the first application 23. For example, the device 10 may perform an uninstall operation of completely deleting all data related to the first application 23 on the date 13 dated June 23rd.

Generally, the term "uninstall" includes only a process of completely deleting an application. However, in one or more exemplary embodiments, the term "uninstall" includes uninstall operations in stages for changing an indication (visual representation) of an application or for deleting or erasing data of the application. In other words, the meaning of "uninstall" is not limited to a general meaning in one or more embodiments, as will be described in detail later.

Hereinafter, structures, functions, and operations of the device 10 for managing the applications 20 installed on the device 100 will be described in detail.

Figure 2:
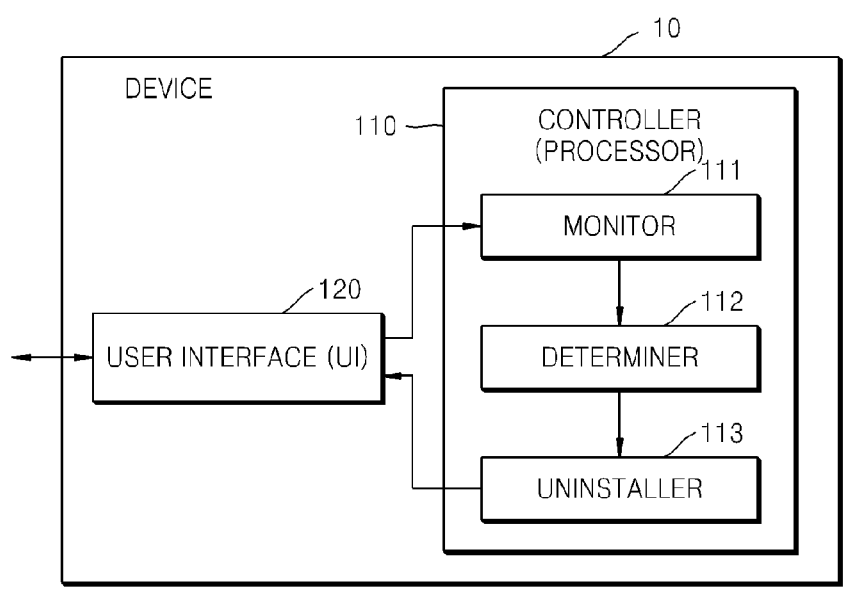
FIG. 2 is a block diagram of a device for managing applications, according to an exemplary embodiment.

FIG. 2 is a block diagram of the device 10 for managing applications, according to an exemplary embodiment. Referring to FIG. 2, the device 10 may include a controller 110 and a user interface (UI) 120.

For clarity, only hardware components related to the current embodiment will be described in FIG. 2. However, it will be readily understood by one of ordinary skill in the art that general-use hardware components other than those shown in FIG. 2 may also be included in the device 10.

Referring to FIG. 2, the controller 110 may include a monitor 111, a determiner 112, and an uninstaller 113. In the device 10, the controller 110 may correspond to a processor, such as a central processing unit (CPU). The processor may be realized by using an array of a plurality of logic gates or may be a general-use microprocessor. In other words, the processor may be realized in any shape of hardware or software module.

The monitor 111 may monitor a use history of each application installed on the device 10. The use history may be defined as a concept including use patterns or use habits accumulated with respect to locations or times of using the application.

In detail, the monitor 111 may monitor how often the application has been used during a threshold time pre-set through the device, or how many times the application has not been used until a pre-set point of time. In other words, the monitor 111 may monitor the use history by collecting information about a use habit and use frequency of each application.

As shown in FIG. 3, the monitor 111 may manage a monitoring result according to applications. In other words, the monitor 111 may monitor different texts of applications, such as use frequencies, used locations, and people using (sharing) corresponding applications, according to types of applications.

FIG. 3 is a table showing a result of the monitor 111 monitoring use histories of applications installed on the device 10, according to an exemplary embodiment.

Referring to FIG. 3, uninstall conditions for determining an uninstall level include a condition wherein an application is not used for a pre-set threshold time, a condition wherein an unused state of an application is repeated a threshold number of times or more until a pre-set point of time, a condition wherein a location of the device 10 is outside a pre-set range, and a condition wherein an application is not shared with another device for a threshold time. However, it will be readily understood by one of ordinary skill in the art that the uninstall conditions may include other similar conditions for monitoring whether an application is used by using the monitored use history.

The monitor 111 may monitor that a use frequency of a first application is 0 times, a use frequency of a second application is 2 times, a use frequency of a third application is 38 times, and a use frequency of a fourth application is 0 times during a threshold time pre-set in the device 10. Here, the pre-set threshold time may be directly set by the user by manipulating the device 10 or may be a default value assigned in an operating system (OS) of the device 10.

Also, the monitor 111 may monitor that an unused number of times of the first application is 4 times, an unused number of times of the second application is 1 time, an unused number of times of the third application is 0 times, and an unused number of times of the fourth application is 0 times at a certain point of time pre-set in the device 10. Here, similarly, the pre-set certain point of time may be directly set by the user by manipulating the device 10, or may correspond to a default value assigned by the OS of the device 10.

Also, the monitor 111 may monitor an average time of using each of the first through fourth applications.

Moreover, the monitor 111 may monitor a place the second application is mostly used, unlike the first, third, and fourth applications. In other words, the monitor 111 may monitor that the place the second application is mostly used is, for example, Gangnam, Seoul. Also, by continuously monitoring the place where the device 10 is currently located, the monitor 111 may monitor that the second application is seldom used or not used at all in areas other than Gangnam.

Also, the monitor 111 may monitor that the fourth application is an application used only when connected to another device in a wireless communication manner, such as Bluetooth or Wi-Fi direct, unlike the first, second, and third applications. Thus, the monitor 111 may monitor the use history of the fourth application by also monitoring a connection frequency to the other device via wireless communication.

Referring back to FIG. 2, the determiner 112 determines at least one application satisfying the pre-set uninstall conditions from among the applications installed in the device 10, based on the monitored use histories as shown in FIG. 3.

In other words, the determiner 112 may determine at least one application corresponding to at least one uninstall level from among a plurality of uninstall levels, based on the monitored use histories. Also, the determiner 112 may additionally determine an uninstall level corresponding to an application determined based on the monitored use histories.

The uninstall conditions may include detailed conditions in stages for classifying uninstall levels to be applied to applications based on a degree of not using the applications. In detail, when the uninstall conditions are satisfied, visual representations of the applications may also be changed, and thus, the uninstall conditions may also be referred to as display state change conditions.

According to the current exemplary embodiment, for convenience of description, the uninstall levels include three levels, i.e., a first uninstall level, a second uninstall level, and a third uninstall level. However, it will be readily understood by one of ordinary skill in the art the uninstall levels may include two or more uninstall levels by subdividing or combining uninstall operations included in the three uninstall levels described below.

One of the reasons that the uninstall conditions may be subdivided to include detailed conditions in stages is to change an indication (or a visual representation) of an application in stages or to delete data until an unused application is finally completely deleted.

An exemplary embodiment when the uninstall condition is a condition wherein an application is not used for a pre-set threshold time as described above will now be described. In this exemplary embodiment, it may be assumed that the pre-set threshold time is one month but is not limited thereto.

When it is determined that the first application, for example, the first application 21 of FIG. 1A, is not used for one month that is the threshold time based on the monitoring result of the monitor 111, the determiner 112 may determine that the first application is at the first uninstall level, which is a lowest uninstall level, after one month.

After it is determined that the first application is at the first uninstall level, when it is determined that the first application is again not used for one month based on the monitoring result of the monitor 111, the determiner 112 may determine that the first application is at the second uninstall level that is a next uninstall level after another one month (total two months).

After it is determined that the first application is at the second uninstall level, and when it is determined that the first application is continuously not used for one month based on the monitoring result of the monitor 111, the determiner 112 may determine that the first application is at the third uninstall level that is a last uninstall level after another one month (total three months). As will be described above, in one or more embodiments, in the third uninstall level, an uninstall operation of completely deleting the first application may be performed. As a result, the first application at the third uninstall level may be permanently removed from the device 10.

Alternatively, an exemplary embodiment where the uninstall condition is a condition wherein an unused state of an application is repeated a threshold number of times up to a pre-set point of time will now be described. In this exemplary embodiment, it may be assumed that the pre-set point of time is after one week and the threshold number of times is 4. Meanwhile, the pre-set point of time may be arbitrarily set based on a use history of an application used by the user in the device 10. Alternatively, the pre-set point of time may be directly set by the user.

When it is determined that the first application, for example, the first application 21 of FIG. 1A, is not used for four weeks based on the monitoring result of the monitor 111, the first application is repeated 4 times that is the threshold number of times. As a result, the determiner 112 determines that the first application is at the first uninstall level that is the lowest uninstall level, at the point of time after 4 weeks.

However, on the other hand, if 4 weeks are passed and the first application is used once only at the third week, the threshold number of times of 4 times is not satisfied, and thus the first application may not be in the first uninstall level.

After it is determined that the first application is at the first uninstall level, when it is determined that the first application is again not used for 4 weeks based on the monitoring result of the monitor 111, the determiner 112 may determine that the first application is at the second uninstall level that is a next uninstall level at a point of time after another 4 weeks (total 8 weeks).

After it is determined that the first application is at the second uninstall level, when it is determined that the first application is continuously not used for 4 weeks based on the monitoring result of the monitor 111, the determiner 112 may determine that the first application is at the third uninstall level that is a last uninstall level at a point of time after another 4 weeks (total 12 weeks).

In this exemplary embodiment, even when the first application is at the first or second uninstall level, the first or second uninstall level may be canceled whenever the user starts to frequently use the first application again. However, if the third uninstall level is applied and the first application is completely deleted, the user may have to install the first application again on the device 10.

An exemplary embodiment where the uninstall condition is a condition wherein the location of the device 10 is outside the pre-set place will now be described with reference to FIG. 4.

Figure 4:
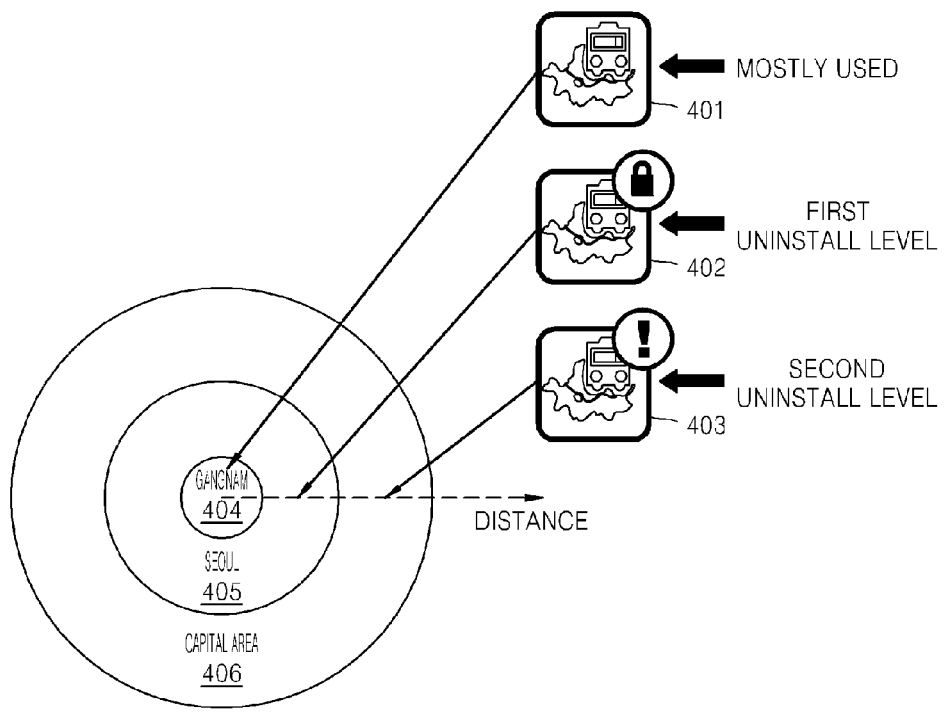
FIG. 4 is a diagram for describing uninstalling of an application according to a location of a device, according to an exemplary embodiment.

FIG. 4 is a diagram for describing uninstalling of an application according to the location of the device 10, according to an exemplary embodiment.

The monitor 111 may, for example, monitor that a place where a bus application 401 is mostly used is Gangnam 404 in Seoul 405. For example, when it is assumed that the bus application 401 is an application for showing bus routes and times within Gangnam 404, the bus application 401 may not be used in Seoul 405 and a capital area 406 other than Gangnam 404.

Upon monitoring the location of the device 10 of FIG. 2, the monitor 111 may monitor that the device 10 is outside Gangnam 404 but still within Seoul 405 at a certain point of time. At this time, the determiner 112 may determine that a bus application 402 is at the first uninstall level that is a lowest uninstall level.

However, upon monitoring the location of the device 10, the monitor 111 may monitor that the device 10 is in the capital area 406 of Seoul 405. At this time, the determiner 112 may determine that a bus application 403 is at the second uninstall level that is a next uninstall level.

However, when the device 10 is again within Seoul 405 based on the monitoring result of the monitor 111, the bus application 403 at the second uninstall level may be restored to the bus application 402 at the first uninstall level. Also, when the device 10 is again in Gangnam 404 based on the monitoring result of the monitor 111, the bus application 402 at the first uninstall level may be restored to the bus application 401 without any uninstall level.

Referring back to FIG. 2, an exemplary embodiment where the uninstall condition is a condition wherein an application is not shared with another device for a threshold time will now be described. Here, it may be assumed that the threshold time is one month.

For example, it may be assumed that the fourth application in FIG. 3 is a game application used only when the device 10 and another device are connected in a wireless communication manner, such as Bluetooth or Wi-Fi direct. In other words, the fourth application cannot be executed by the device 10 only.

The monitor 111 may monitor the use history of the fourth application by monitoring the use frequency of the fourth application and the connection frequency to the other device in a wireless communication manner. As a result, the monitor 111 may monitor that the connection frequency is 0 times for one month of the threshold time. In this case, the determiner 112 may determine that the fourth application is at the first uninstall level.

After the fourth application is determined to be at the first uninstall level, when the monitor 111 monitors that the connection frequency of the fourth application to the other device is again 0 times for one month, the determiner 112 may determine that the fourth application is at the second uninstall level that is a next uninstall level at a point of time after another one month (total two months).

However, even when the fourth application is at the first or second uninstall level, the first or second uninstall level may be canceled at any time when the fourth application is frequently used by being connected to the other device in a wireless communication manner.

As a result, when the uninstall condition is a condition wherein an application is not used for a pre-set threshold time, the determiner 112 determines at least one application that is not used for the pre-set threshold time based on monitoring results.

Alternatively, when the uninstall condition is a condition wherein an unused state of an application is repeated a threshold number of times or more until a pre-set point of time, the determiner 112 determines at least one application whose unused state repeats at least the threshold number of times until the pre-set point of time based on monitoring results.

Alternatively, when the uninstall condition is a used location or a connection frequency to another device, the determiner 112 may determine an uninstall level of each application based on monitoring results. In other words, the uninstall level of each application may be determined by monitoring different contexts, such as use frequencies, used locations, and people using (sharing) corresponding applications, according to types of applications.

The uninstaller 113 may change an icon of a determined application to a display state corresponding to an uninstall level of the determined application. Here, the UI 120 may display the icon having the display state on a UI screen.

At the same time, the uninstaller 113 performs an uninstall operation corresponding to the uninstall level of the determined application on the determined application.

First, uninstall operations performed on a determined application in uninstall levels will be described in detail.

FIG. 5 is a table for describing uninstall operations performed at each uninstall level, according to an exemplary embodiment. Referring to FIG. 5, uninstall operations performed at each of the first uninstall level, the second uninstall level, and the third uninstall level are described. For convenience of description, it is assumed that an application determined by the determiner 112 is the first application 21 of FIG. 1A in FIG. 5.

When the first application is determined to be at the first uninstall level, the uninstaller 113 performs a first uninstall operation corresponding to the first uninstall level on the first application.

In detail, the uninstaller 113 performs the first uninstall operation of ending functions of the device 10 required to drive the first application. Here, the ended functions include a function of exchanging information between the device 10 and a server (not shown) for providing a service of the first application through a network, a function of automatically updating the first application, and a background process of the first application.

In other words, the uninstaller 113 does not delete the first application itself, but performs the first uninstall operation by stopping a network traffic or network message generated by the first application, ending processes executed in a background of the device 10 for the first application, and ends an automatic update of the first application.

However, if the first application is used again by the user after the first uninstall operation is performed, the uninstaller 113 activates functions of the first application ended through the first uninstall operation.

When the first application is determined to be at the second uninstall level, the uninstaller 113 performs a second uninstall operation corresponding to the second uninstall level on the first application.

In detail, the uninstaller 113 performs the second uninstall operation by deleting user data stored in the device 10 while using the first application, while maintaining only an icon of the first application displayed on the UI screen, and backing up the user data stored in the device 10 on a server.

Here, the user data includes basic setting information for driving the first application, login information of the first application, contents stored while using the first application, history information, and transaction information.

However, if the first application is used again by the user after the second uninstall operation is performed, the uninstaller 113 may restore (or roll back) the user data of the first application backed up in the server to the device 10.

When the first application is determined to be at the third uninstall level, the uninstaller 113 performs a third uninstall operation corresponding to the third uninstall level on the first application.

In detail, the uninstaller 113 performs the third uninstall operation by deleting the icon of the first application and entire information about the first application.

However, in the third uninstall operation, because the first application is completely deleted from the device 10, the device 10 may be pre-set such as to receive a user selection about whether to finally perform the third uninstall operation, i.e., whether to completely delete the first application, through the UI 120. In this case, the uninstaller 1130 may perform the third uninstall operation only when the user requests to perform the third uninstall operation through the UI 120.

It will be readily understood by one of ordinary skill in the art that other operations for accomplishing purposes of the first through third uninstall operations performed in the first through third uninstall levels described herein are within the scope of one or more exemplary embodiments, even if not described.

Referring back to FIG. 2, as described above, the uninstaller 113 changes the icon of the first application to a display state corresponding to an uninstall level of the first application (determined application), and the UI 120 displays the icon having the changed display state on the UI screen.

When an uninstall operation corresponding to an uninstall level is performed on the first application, the UI 120 may insert and display a predetermined symbol on a part of the icon of the first application. Here, the inserted symbol may have a padlock shape or an exclamation mark, but is not limited thereto.

Alternatively, when an uninstall operation corresponding to an uninstall level is performed on the first application, the UI 120 may adjust and display at least one of a color, brightness, chroma, and luma of the icon of the first application.

Alternatively, when an uninstall operation corresponding to an uninstall level is performed on the first application, the UI 120 may apply and display a predetermined visual effect to the icon of the first application.

Examples of the changed display state of the icon displayed through the UI 120 include a state wherein a symbol is inserted into a part of the icon, a state wherein the icon is dark, a state wherein the icon is foggy, a state wherein the icon is in a grayscale, a state wherein dotted lines are inserted to a boundary of the icon, a state wherein the icon is visually concave, a state wherein the icon is visually convex, and a state wherein the icon is shabby, but are not limited thereto.

A changed display state of an icon to which an uninstall operation is applied (in an uninstall level) is not limited as long as the icon is distinguished from icons of other applications to which an uninstall operation is not applied (not in an uninstall level).

This will be described in detail with reference to FIGS. 6A through 6F. In FIGS. 6A through 6F, UI screens viewed in front of the device 10 in a point of view of the user. Here, applications shown in FIGS. 6A through 6F may be results of changing displays of icons of the applications, or results of overlapping layers of others object on layers of the icons of the applications without changing the displays of the icons of the applications. Also, even when display states of the icons are changed as above, the user may perceive the same visual effects because the user only sees the front of the device 10.

Figure 6A:
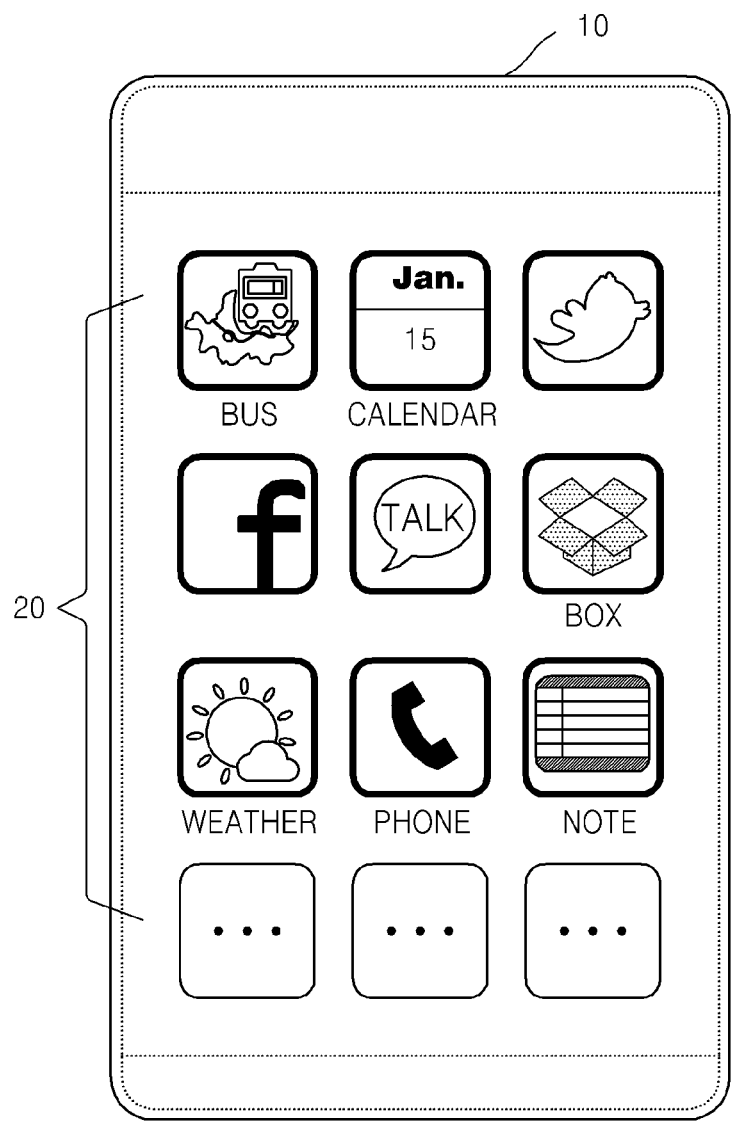
FIG. 6A illustrates a user interface (UI) screen displaying applications installed on a device, according to an exemplary embodiment.

FIG. 6A illustrates a UI screen displaying the applications 20 installed in the device 10, according to an exemplary embodiment. Referring to FIG. 6A, the applications 20, such as a bus application, a calendar application, a box application, a weather application, a phone application, and a note application, are installed in the device 10, and icons corresponding to objects representing the applications 20 may be displayed on the UI screen. The UI screen of FIG. 6A is only an example and is not limited thereto.

Meanwhile, the applications 20 may include applications that are basically installed along with the OS of the device 10, such as the calendar application, the phone application, and the note application. In other words, the basically installed applications are not directly installed by the user who is using the device 10, but may be installed via an initial booting of the device 10 so as to perform basic functions provided by the device 10, such as a phone call, a text, and a memo. Accordingly, such basically installed applications may not be managed according to one or more exemplary embodiments. In other words, the controller 110 including the monitor 111, the determiner 112, and the uninstaller 113 may be set to operate while excluding the basically installed applications. However, alternatively, operations and functions of the controller 110 may also be applied to the basically installed applications according to a setting of the user.

Figure 6B:
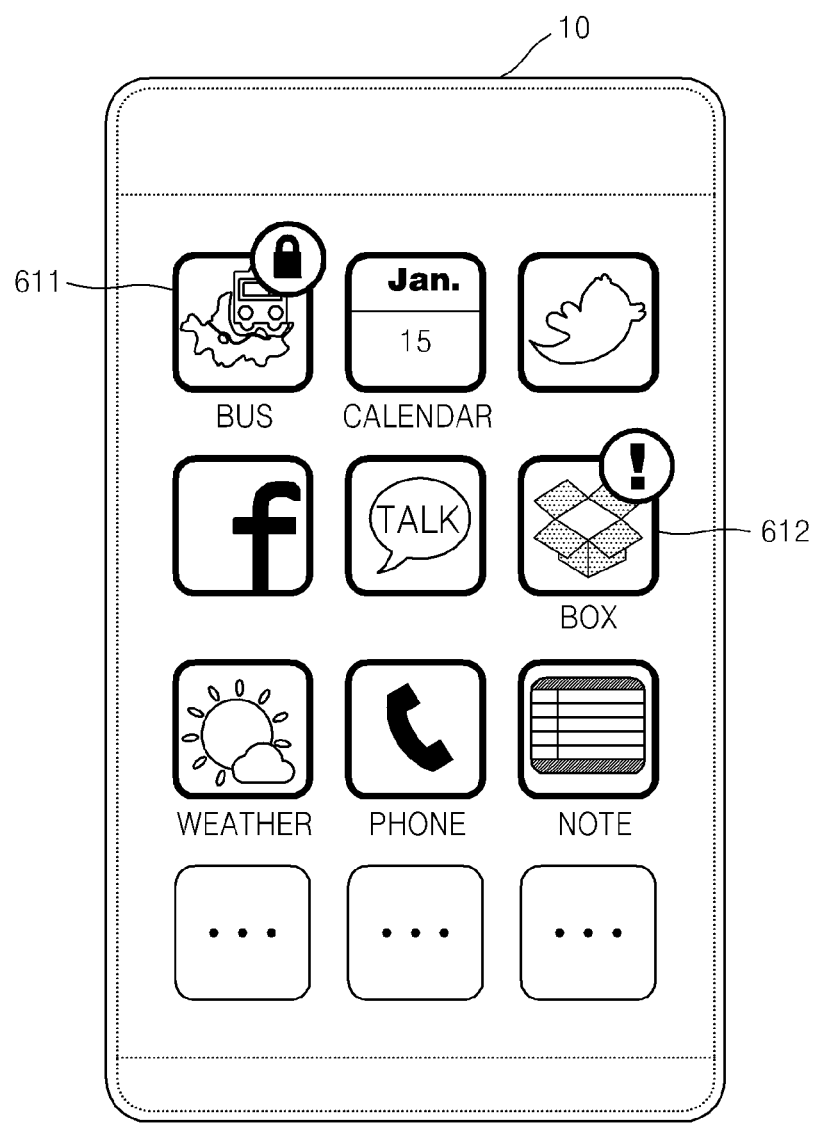
FIG. 6B illustrates a UI screen where an uninstall operation is applied to applications installed on a device, according to an exemplary embodiment.

FIG. 6B illustrates a UI screen where an uninstall operation is applied to the applications 20 installed on the device 10, according to an exemplary embodiment. Referring to FIG. 6B, a bus application 611 is at the first uninstall level and a box application 612 at in the second uninstall level.

As described above, the determiner 112 may determine that the bus application 611 is at the first uninstall level based on a monitored use history of the bus application 611. Also, the determiner 112 may determine that the box application 612 is at the second uninstall level based on a monitored use history of the box application 612.

The uninstaller 113 changes a display state of an icon of the bus application 611 at the first uninstall level such that a padlock symbol is inserted to the icon. Then, the UI 120 displays the icon of the bus application 611 into which padlock symbol is inserted at a right top corner on the UI screen. Thus, the user may recognize that the bus application 611 is currently at the first uninstall level and the first uninstall operation is applied to the bus application 611.

Meanwhile, the changing of the display state (visual representation) of the icon of the bus application 611 may be performed by inserting the padlock symbol to the icon of the bus application 611. Alternatively, the changing of the display state of the icon of the bus application 611 may be performed by additionally overlapping a layer of the padlock symbol that is another object on a layer of the icon of the bus application 611. In other words, the current embodiment is not limited by any one of the above.

As described above, such methods are applied to change a display state (visual representation) of an application described here, and may be applied to change the display state such that an exclamation mark symbol is inserted to an icon (object) of the application, the icon is shown dark, the icon is shown blurry, a boundary of the icon is in dotted lines, or the icon is shown concave.

The uninstaller 113 may change the display state of the icon of the box application 612 at the second uninstall level such that an exclamation mark symbol is inserted to the icon of the box application 612. Then, the UI 120 displays the icon of the box application 612 into which the exclamation mark symbol is inserted in a top right corner on the UI screen. Accordingly, the user may recognize that the box application 612 is currently at the second uninstall level and the second uninstall operation is applied to the box application 612.

As such, the device 10 according to the current embodiment manages applications that are seldom used or not used by changing display states of the applications so that the user is able to easily manage the applications. In detail, the device 10 changes the display states of the applications according to uninstall levels so that the user is able to easily recognize a state of the applications and manage the applications.

Figure 6C:
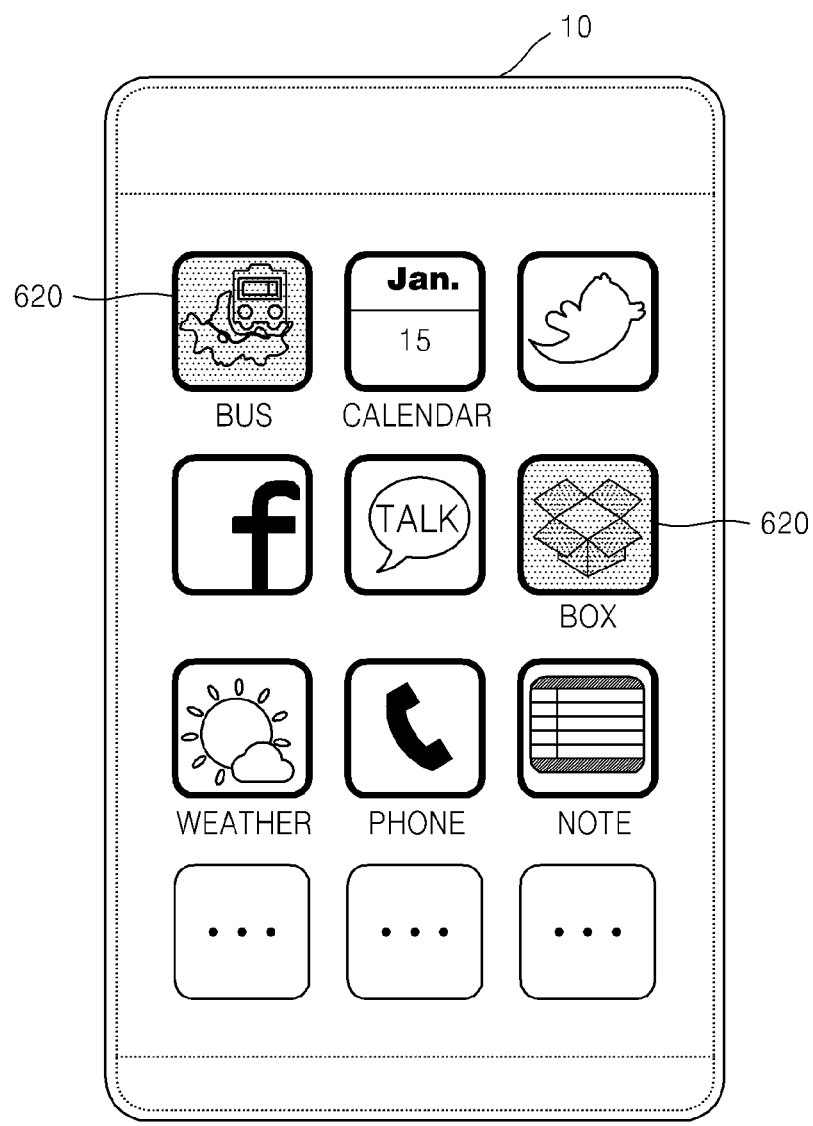
FIG. 6C illustrates a UI screen where an uninstall operation is applied to applications installed on a device, according to another exemplary embodiment.

FIG. 6C illustrates a UI screen where an uninstall operation is applied to the applications 20 installed in the device 10, according to another exemplary embodiment. Referring to FIG. 6C, bus and box applications 620 are at the first uninstall level.

As described above, the determiner 112 may determine that the bus and box applications 620 are in the first uninstall level based on monitored use histories of the bus and box applications 620.

The uninstaller 113 may change display states of icons of the bus and box applications 620 in the first uninstall level such that the icons are shown as being darker. Then, the UI 120 displays the icons of the bus and box applications 620, which are shown darker, on the UI screen. Accordingly, the user may recognize that the bus and box applications 620 are currently at the first uninstall level and the first uninstall operation is applied to the bus and box applications 620.

According to FIG. 6C, it is assumed that the bus and box applications 620 are at the same first uninstall level. However, if the bus and box applications 620 are at different uninstall levels, the UI 120 may display icons of the bus and box applications 620 at different degrees of darkness for classification.

Figure 6D:
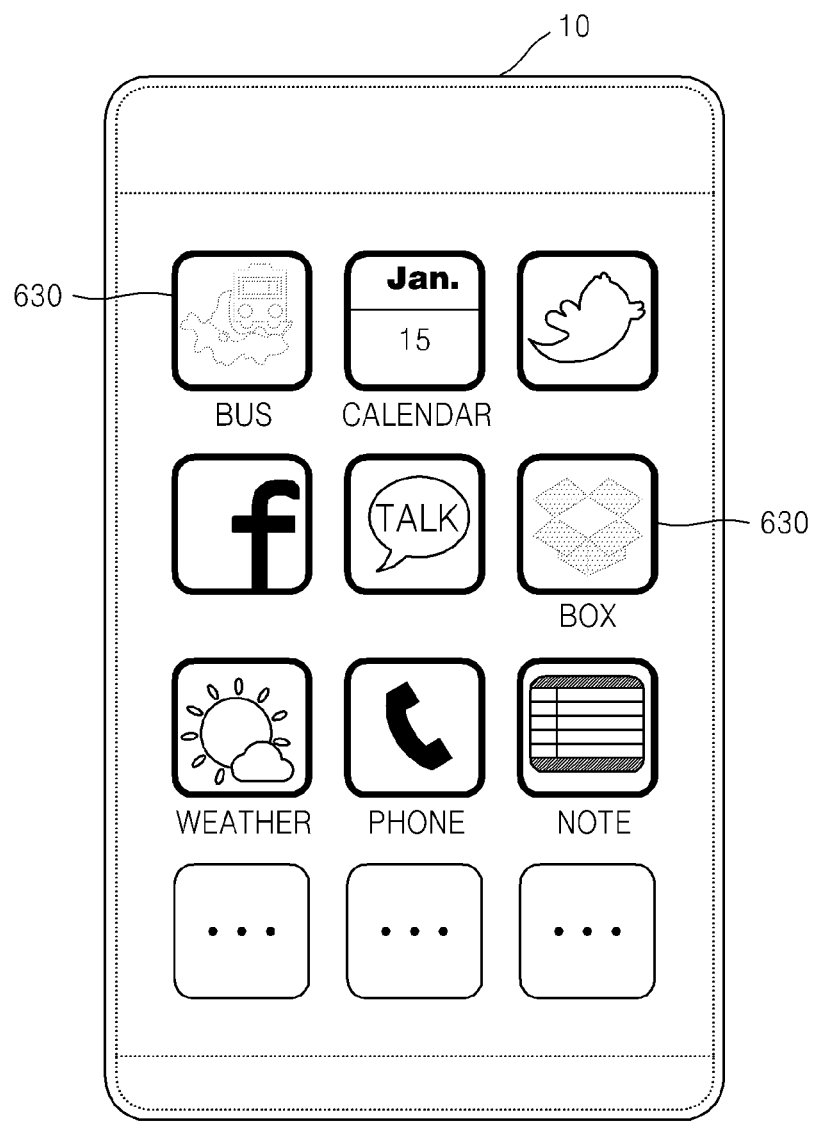
FIG. 6D illustrates a UI screen where an uninstall operation is applied to applications installed on a device, according to another exemplary embodiment.

FIG. 6D illustrates a UI screen where an uninstall operation is applied to the applications 20 installed in the device 10, according to another exemplary embodiment. In FIG. 6D, bus and box applications 630 are at the first uninstall level.

As described above, the determiner 112 may determine that the bus and box applications 630 are at the first uninstall level based on monitored use histories of the bus and box applications 630.

The uninstaller 113 may change display states of icons of the bus and box applications 630 in the first uninstall level such that the icons are shown blurry. Then, the UI 120 displays the icons of the bus and box applications 630, which are shown blurry, on the UI screen. Accordingly, the user may recognize that the bus and box applications 630 are currently at the first uninstall level and the first uninstall operation is applied to the bus and box applications 630.

According to FIG. 6D, it is assumed that the bus and box applications 630 are at the same first uninstall level. However, if the bus and box applications 630 are at different uninstall levels, the UI 120 may display icons of the bus and box applications 630 in different degrees of blurriness for classification.

Figure 6E:
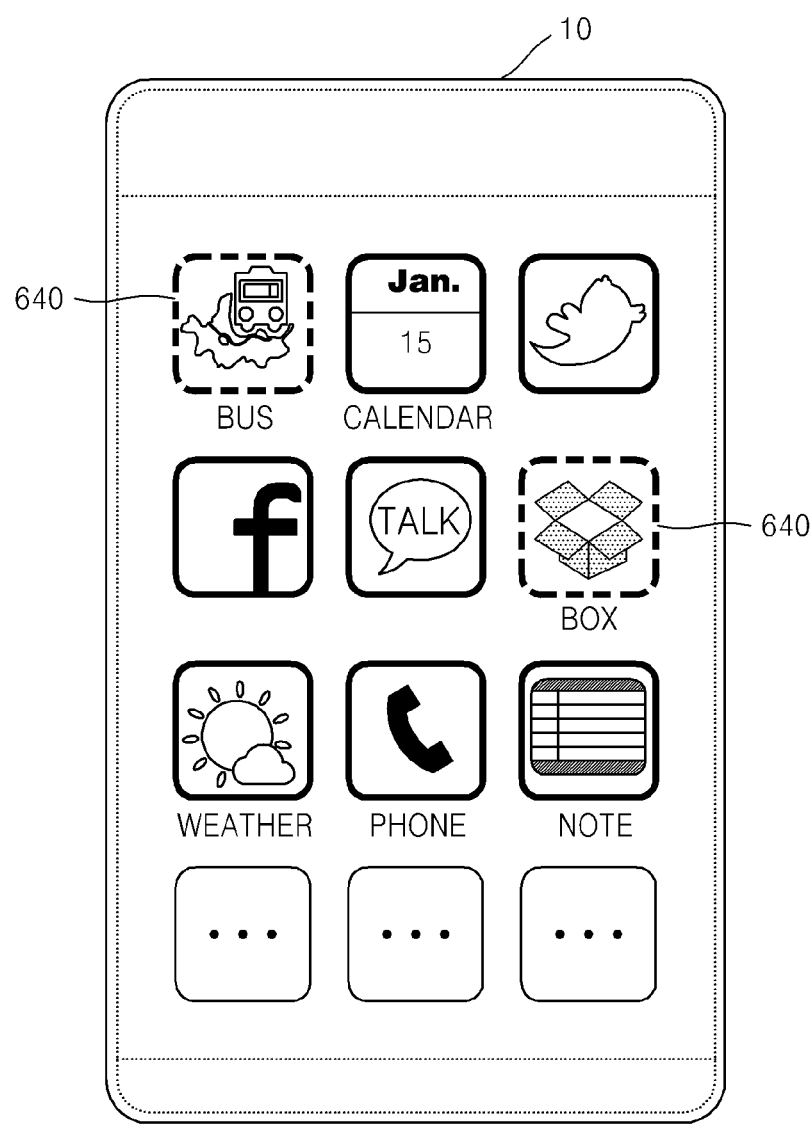
FIG. 6E illustrates a UI screen where an uninstall operation is applied to applications installed on a device, according to another exemplary embodiment.

FIG. 6E illustrates a UI screen where an uninstall operation is applied to the applications 20 installed in the device 10, according to another exemplary embodiment. Referring to FIG. 6E, it is assumed that bus and box applications 640 are at the first uninstall level.

As described above, the determiner 112 may determine that the bus and box applications 640 are at the first uninstall level based on monitored use histories of the bus and box applications 640.

The uninstaller 113 may change display states of icons of the bus and box applications 640 at the first uninstall level such that boundaries of the icons are in dotted lines. Then, the UI 120 displays the icons of the bus and box applications 640 whose boundaries are in dotted lines on the UI screen. Accordingly, the user may recognize that the bus and box applications 640 are currently at the first uninstall level and the first uninstall operation is applied to the bus and box applications 640.

Figure 6F:
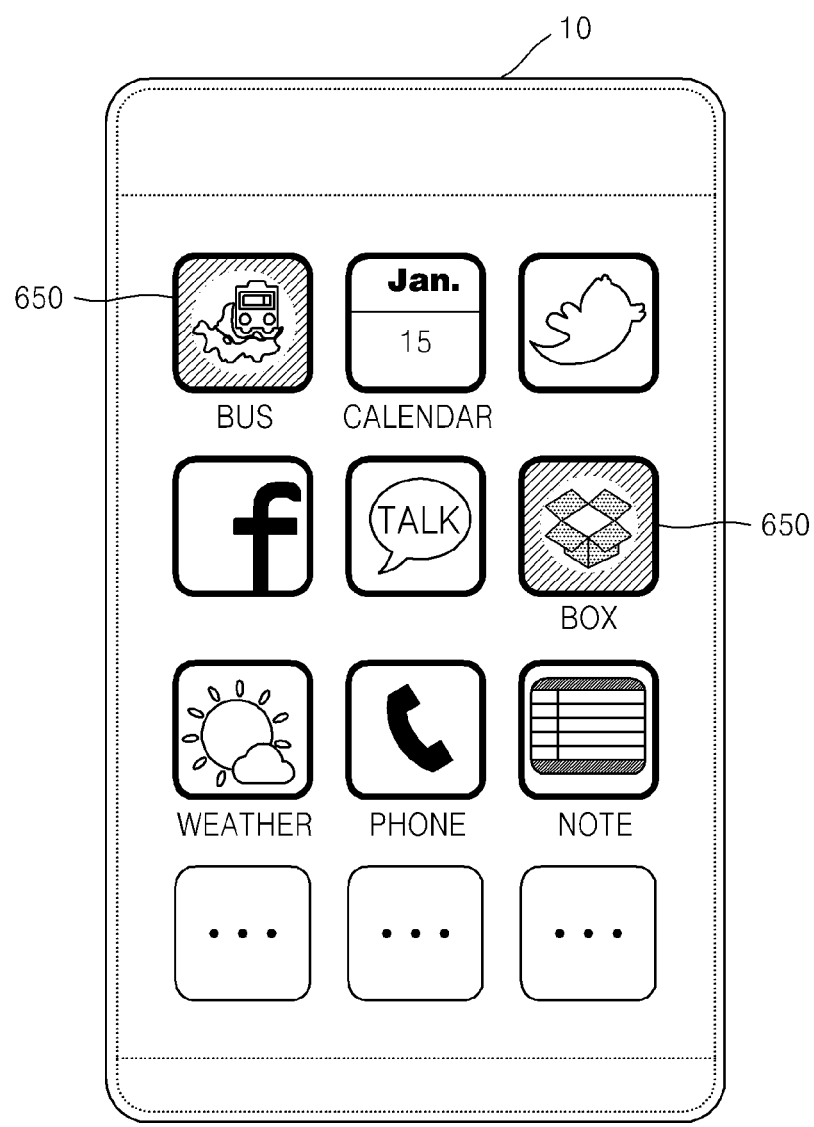
FIG. 6F illustrates a UI screen where an uninstall operation is applied to applications installed on a device, according to another exemplary embodiment.

FIG. 6F illustrates a UI screen in which an uninstall operation is applied to the applications 20 installed in the device 10, according to another exemplary embodiment. Referring to FIG. 6F, it is assumed that bus and box applications 650 are at the first uninstall level.

As described above, the determiner 112 may determine that the bus and box applications 650 are at the first uninstall level based on monitored use histories of the bus and box applications 650.

The uninstaller 113 may change display states of icons of the bus and box applications 650 in the first uninstall level such that the icons are shown concave. Then, the UI 120 displays the icons of the bus and box applications 650 shown concave on the UI screen. Accordingly, the user may recognize that the bus and box applications 650 are currently at the first uninstall level and the first uninstall operation is applied to the bus and box applications 650.

It will be readily understood by one of ordinary skill in the art that the UI screens shown in FIGS. 6A through 6F are only examples for describing display states of icons of applications, and thus are not limited thereto.

Figure 7A:
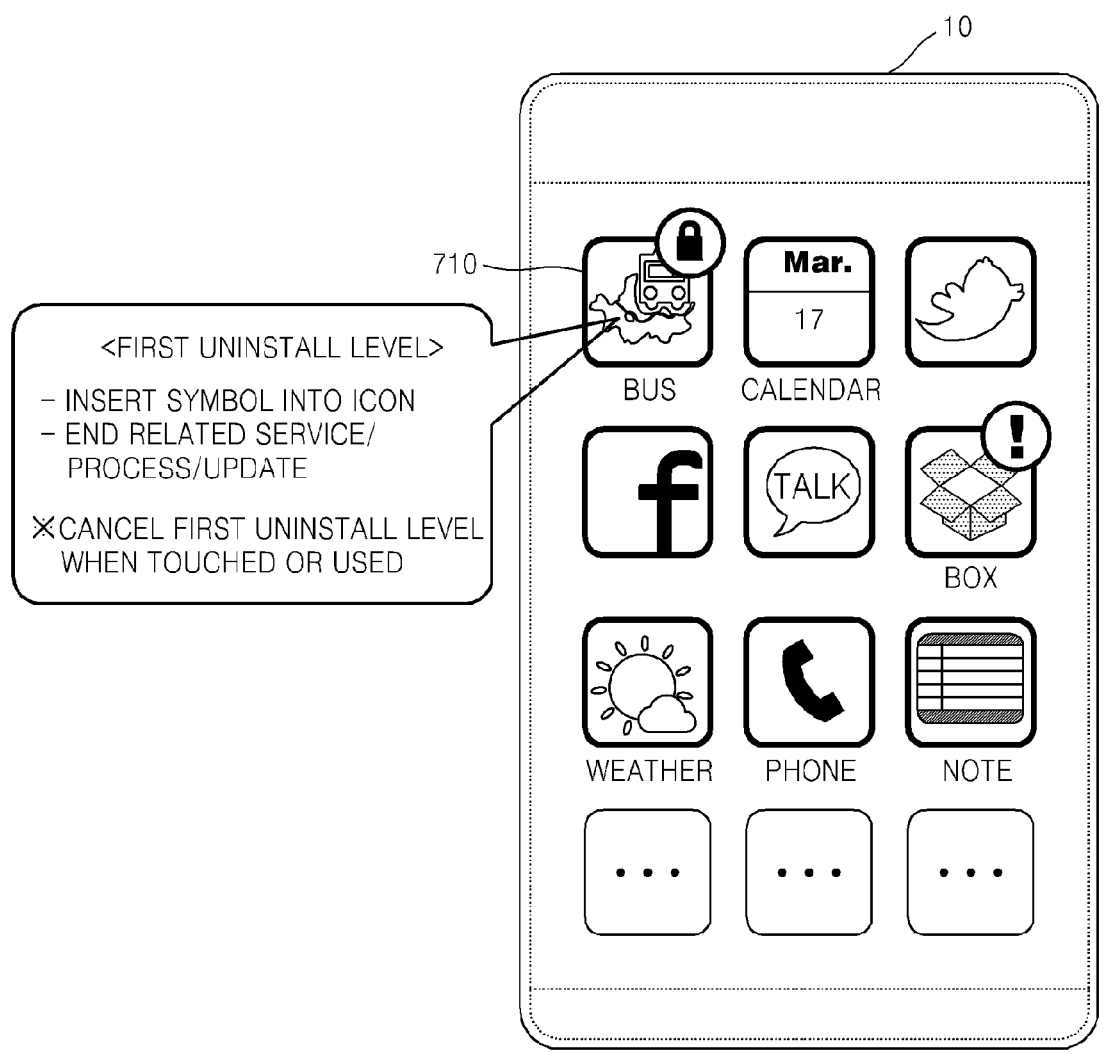
FIG. 7A is a diagram for describing a first uninstall operation preformed at a first uninstall level, according to an exemplary embodiment.

FIG. 7A is a diagram for describing the first uninstall operation preformed at the first uninstall level, according to an exemplary embodiment. Referring to FIG. 7A, it is assumed that a bus application 710 is at the first uninstall level.

As described above, the determiner 112 may determine that the bus application 710 is at the first uninstall level based on monitored use history of the bus application 710.

The uninstaller 113 may change a display state of an icon of the bus application 710 at the first uninstall level such that a padlock symbol is added onto the icon of the bus application 710. Then, the UI 120 displays the icon of the bus application 710 onto which the padlock symbol is inserted in a top right corner on the UI screen.

Moreover, the uninstaller 113 performs the first uninstall operation of ending functions of the device 10 required to drive the bus application 710. The ended functions includes a function of exchanging information between the device 10 and a server for providing a service of the bus application 710 through a network, a function of automatically updating the bus application 710, and a background process of the bus application 710.

The uninstaller 113 may not delete the bus application 710 but performs the first uninstall operation by stopping a network traffic or network message generated by the bus application 710, ending processes executed in the background of the device 10 for the bus application 710, and ends an automatic update of the bus application 710.

However, if the bus application 710 is used again by the user after the first uninstall operation is performed, the uninstaller 113 may again activate the functions of the bus application 710 ended through the first uninstall operation.

Figure 7B:
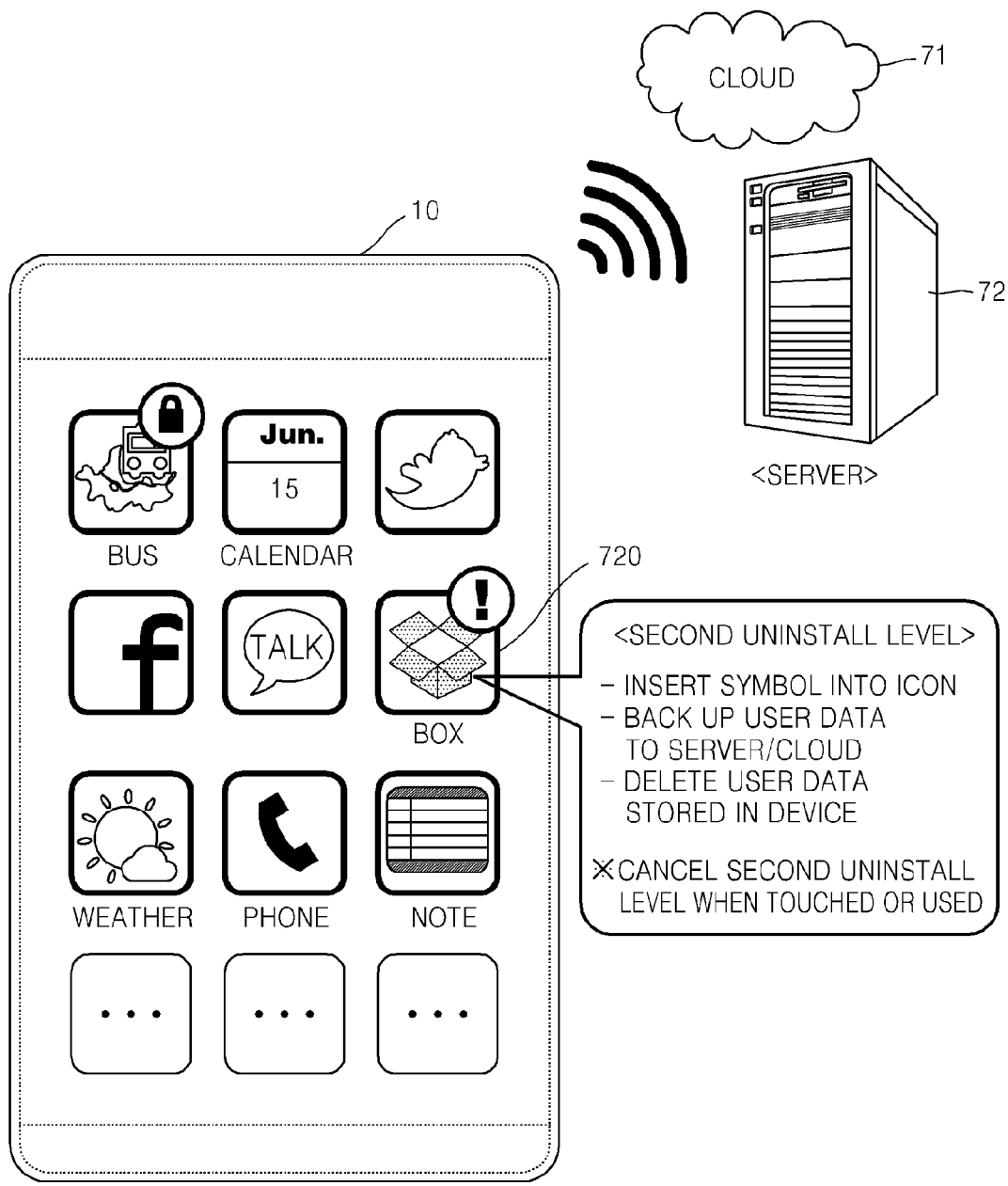
FIG. 7B is a diagram for describing a second uninstall operation preformed at a second uninstall level, according to an exemplary embodiment.

FIG. 7B is a diagram for describing the second uninstall operation preformed at the second uninstall level, according to an exemplary embodiment. Referring to FIG. 7B, it is assumed that a box application 720 is at the second uninstall level.

As described above, the determiner 112 may determine that the box application 720 is at the second uninstall level based on monitored use history of the box application 720.

The uninstaller 113 may change a display state of an icon of the box application 720 at the second uninstall level such that an exclamation mark symbol is inserted in the icon of the box application 720. Then, the UI 120 displays the icon of the box application 720 into which the exclamation mark symbol is inserted in a top right corner on the UI screen.

Moreover, the uninstaller 113 performs the second uninstall operation by maintaining only the icon of the box application 720 for displaying the box application 720 on the UI screen while deleting user data stored in the device 10 while using the box application 720 and backing up the user data stored in the device 10 in a cloud 71 or a server 72.

The user data may include basic setting information for driving the box application 720, login information of the box application 720, a content stored while using the box application 720, history information, and transaction information.

However, if the box application 720 is used again by the user after the second uninstall operation is performed, the uninstaller 113 may again restore (or roll back) the user data of the box application 720 backed up in the cloud 71 or the server 72 to the device 10.

Figure 7C:
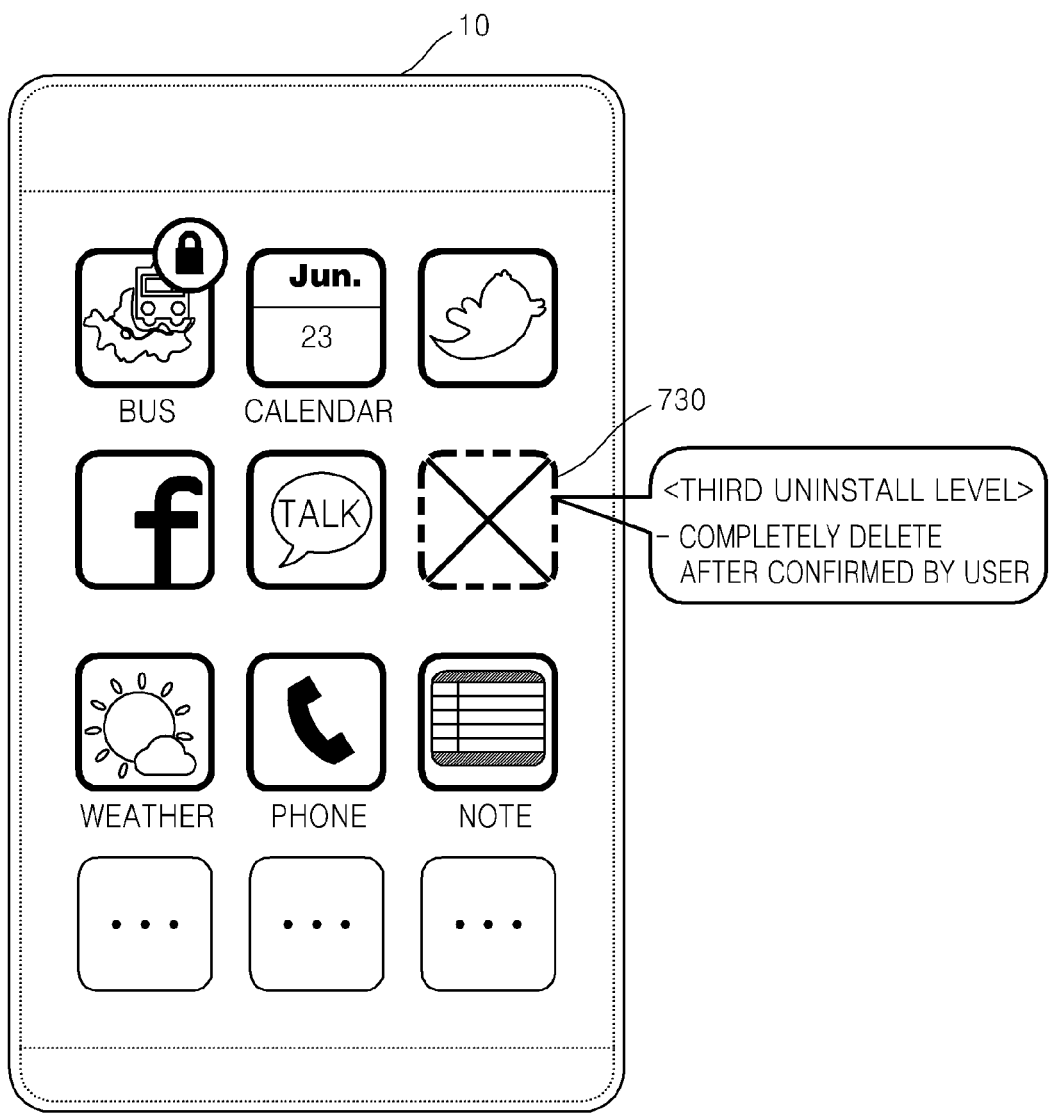
FIG. 7C is a diagram for describing a third uninstall operation preformed at a third uninstall level, according to an exemplary embodiment.

FIG. 7C is a diagram for describing the third uninstall operation preformed at the third uninstall level, according to an exemplary embodiment. Referring to FIG. 7C, it is assumed that a box application 730 is at the third uninstall level.

As described above, the determiner 112 may determine that the box application 730 is at the third uninstall level based on monitored use history of the box application 730.

The uninstaller 113 performs the third uninstall operation by deleting an icon of the box application 730 and entire information about the box application 730. In other words, the box application 730 may be completely deleted not only from the UI screen but also from the device 10 and the cloud 71 or server 72 of FIG. 7B.

However, in the third uninstall operation, because the box application 730 is completely deleted from the device 10, the device 10 may be pre-set such as to receive a user selection about whether to finally perform the third uninstall operation, i.e., whether to completely delete the box application 730, through the UI 120. In this case, the uninstaller 1130 may perform the third uninstall operation only when the user requests to perform the third uninstall operation through the UI 120.

Figure 8:
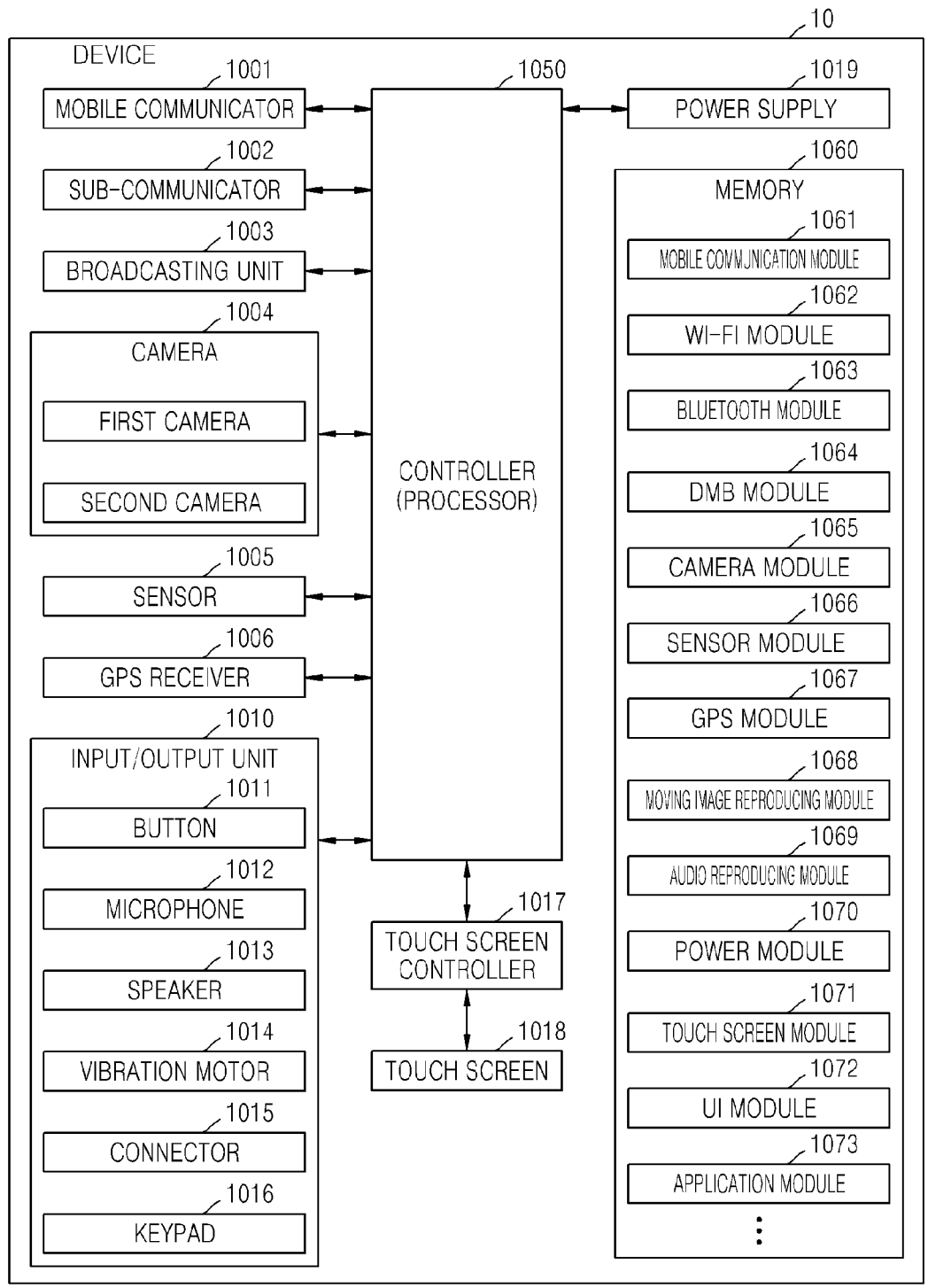
FIG. 8 is a detailed block diagram of a device for managing applications, according to an exemplary embodiment.

FIG. 8 is a detailed block diagram of the device 10 for managing applications, according to an exemplary embodiment. Components included in the device 10 of FIG. 2 described above may also be included in the device 10 of FIG. 8.

A mobile communicator 1001 may perform call setting, data communication, or the like with a base station through a cellular network, such as 3rd generation (3G) or 4th generation (4G). A sub-communicator 1002 performs a function for short distance communication, such as Bluetooth or near field communication (NFC). A broadcasting unit 1003 receives a digital multimedia broadcasting (DMB) signal.

A camera 1004 may include lens and optical devices for capturing an image or moving image.

A sensor unit 1005 may include a gravity sensor for detecting movement of the device 10, an illumination sensor for detecting light brightness, a proximity sensor for detecting a proximity degree of a person, and a motion sensor for detecting movement of a person.

A global positioning system (GPS) receiver 1006 may receive a GPS signal from a satellite. Various services may be provided to the user by using the GPS signal.

An input/output unit 1010 may provide an interface with an external device or a person, and includes a button 1011, a microphone 1012, a speaker 1013, a vibration motor 1014, a connector 1015, and a keypad 1016.

A touch screen 1018 may receive a touch input of the user. Also, a touch screen controller 1017 transmits the touch input received through the touch screen 1018 to a controller 1050. A power supply 1019 is connected to a battery or external power source to supply power required for the device 10.

The input/output unit 1010 and the touch screen 1018 may correspond to detailed components of the UI 120 of FIG. 2.

The controller 1050 may execute programs stored in a memory 1060 to execute an object on a display and display a result of executing, according to an exemplary embodiment.

The controller 1050 may correspond to the controller 110 of FIG. 2 including the monitor 111, the determiner 112, and the uninstaller 113.

The memory 1060 may store results processed or performed by the device 10. For example, the memory 1060 may store monitoring results of the monitor 111, determining results of the determiner 112, and uninstalling results of the uninstaller 113.

Programs stored in the memory 1060 may be classified into a plurality of modules according to functions, for example, into a mobile communication module 1061, a Wi-Fi module 1062, a Bluetooth module 1063, a DMB module 1064, a camera module 1065, a sensor module 1066, a GPS module 1067, a moving image reproducing module 1068, an audio reproducing module 1069, a power module 1070, a touch screen module 1071, a UI module 1072, and an application module 1073.

For example, the mobile communication module 1061, the Wi-Fi module 1062, and the Bluetooth module 1063 may receive information about an object from another device or a server by using at least one of the mobile communicator 1001, the sub-communicator 1002, and the broadcasting unit 1003.

Also, for example, the touch screen module 1071 may receive a touch input of the user through a screen of the device 10.

Also, for example, the application module 1073 may determine a type of the touch input of the user and determine whether to expand an object according to the touch input. Also, for example, the application module 1073 may determine whether a size of the expanded object is equal to or above a threshold value, and determine which information to be displayed on the expanded object. Also, for example, the application module 1073 may determine how to process a display screen according to the expansion of the object.

Also, for example, the UI module 1072 may expand and display an object on the display screen, and display predetermined information on the expanded object based on the determination of the application module 1073. Also, for example, the UI module 1072 may fix and display the expanded object, or reduce the expanded object based on the determination of the application module 1073.

Functions of each module may be intuitively inferred by one of ordinary skill in the art based on its name, and each module may correspond to a group of commands for performing at least one function described herein.

Commands do not have to be executed in separate software programs, procedures, or modules. The memory 1060 may include more or less commands. Moreover, various functions of the device 10 may be executed by hardware and/or software including at least one signal processing and/or application specified integrated circuit (IC).

Figure 9:
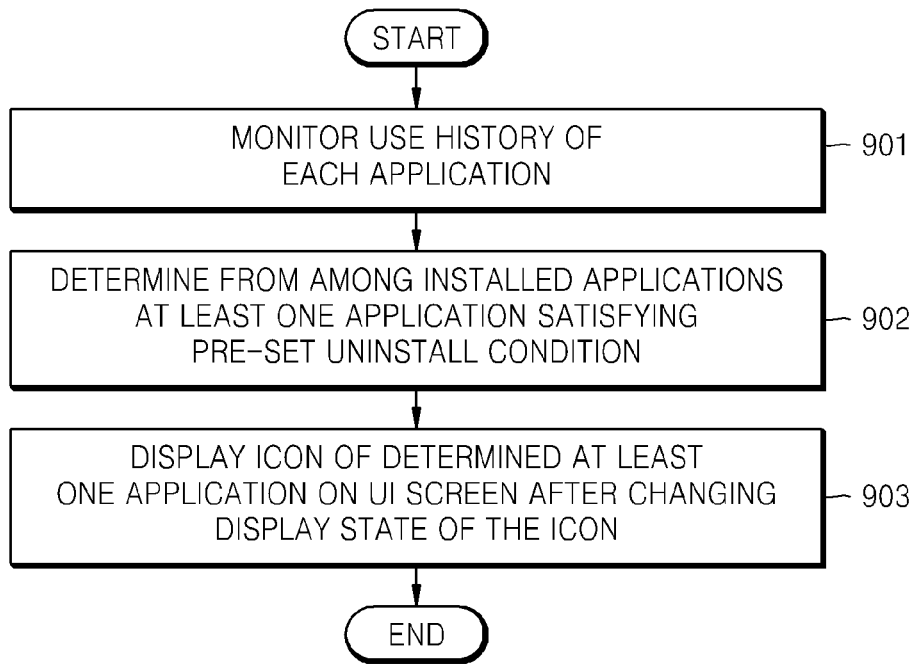
FIG. 9 is a flowchart illustrating a method of managing applications installed on a device, according to an exemplary embodiment.

FIG. 9 is a flowchart illustrating a method of managing applications installed on the device 10, according to an exemplary embodiment. Referring to FIG. 9, the method may include operations processed by the device 10 of FIG. 2 or 8 in time series, and thus, details described above with reference to FIGS. 1A through 8 may also apply to the method of FIG. 9 even if omitted.

In operation 901, the controller 110 controls the monitor 111 to monitor use histories of applications installed in the device 10.

In operation 902, the controller 110 controls the determiner 112 to determine at least one application satisfying a pre-set uninstall condition from among the installed applications based on the monitored use histories.

In operation 903, the UI 120 displays an icon of the determined at least one application on the UI screen after changing a display state of the icon.

Figure 10:
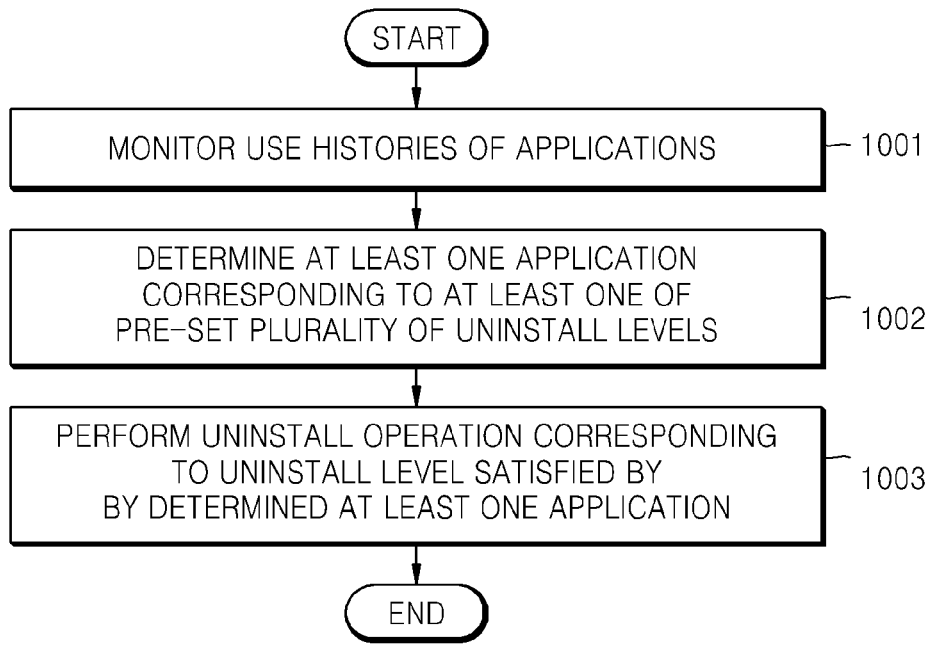
FIG. 10 is a flowchart illustrating a method of managing applications installed on a device, according to another exemplary embodiment.

FIG. 10 is a flowchart illustrating a method of managing applications installed on the device 10, according to another exemplary embodiment. Referring to FIG. 10, the method includes operations processed by the device 10 of FIG. 2 or 8 in time series, and thus, details described above with reference to FIGS. 1A through 8 may also be applied to the method of FIG. 10 even if omitted.

In operation 1001, the controller 110 controls the monitor 111 to monitor use histories of the applications installed in the device 10.

In operation 1002, the controller 110 controls the determiner 112 to determine at least one application corresponding to at least one of a pre-set plurality of uninstall levels, based on the monitored use histories.

In operation 1003, the controller controls the uninstaller 113 to perform an uninstall operation corresponding to an uninstall level satisfied by the determined at least one application on the determined at least one application.

Figure 11:
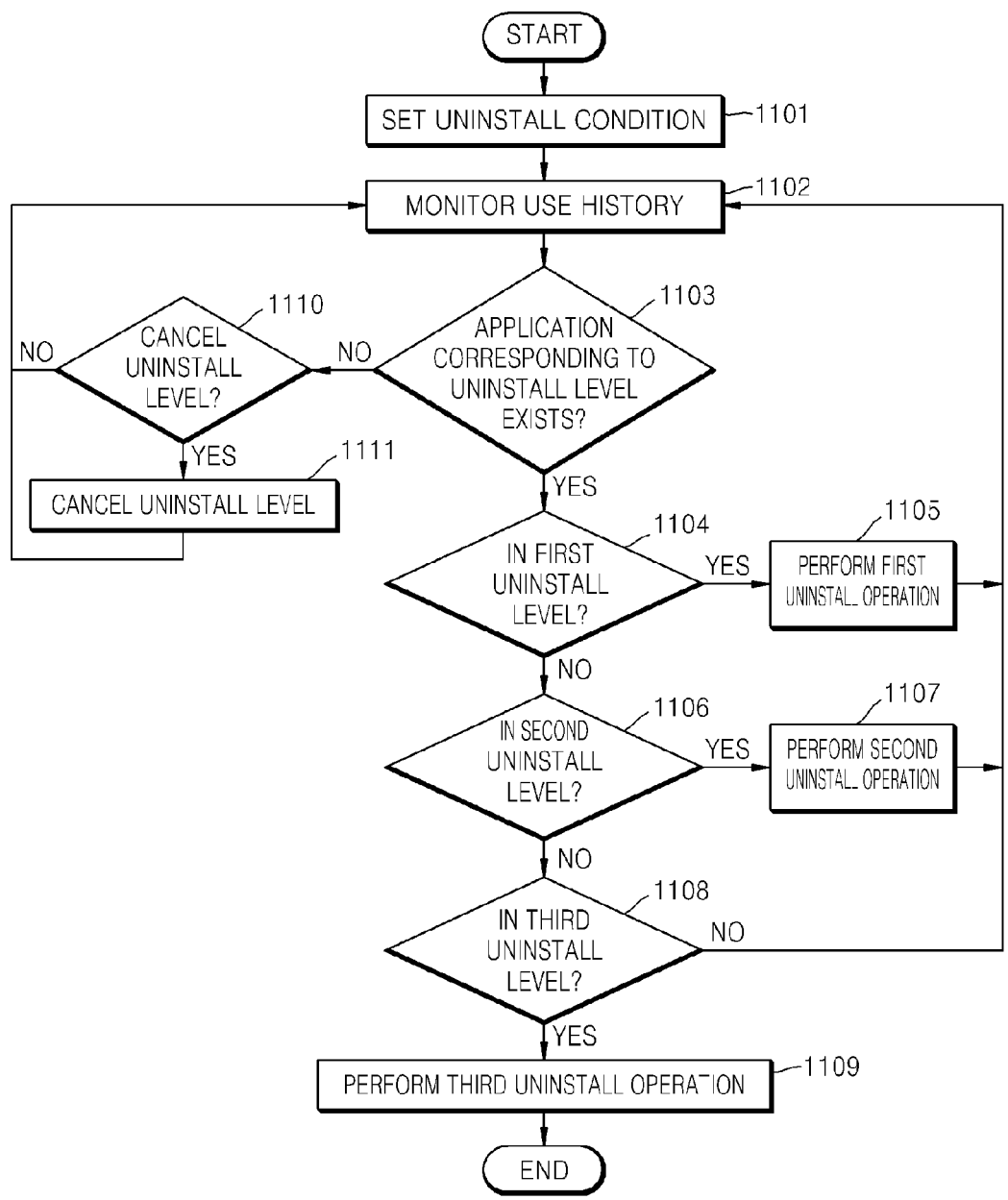
FIG. 11 is a flowchart illustrating a method of managing applications installed on a device, according to another exemplary embodiment.

FIG. 11 is a flowchart illustrating a method of managing applications installed on the device 10, according to another exemplary embodiment. FIG. 11 is a detailed flowchart of the methods of FIGS. 9 and 10. Referring to FIG. 11, the method includes operations processed by the device 10 of FIG. 2 or 8 in time series, and thus, details described above with reference to FIGS. 1A through 8 may also apply to the method of FIG. 11 even if omitted.

In operation 1101, the device 10 sets an uninstall condition for each uninstall level, according to a user input through the UI 120. Also, if the uninstall condition is not set by the user, the device 10 may arbitrarily set the uninstall condition to a default value assigned by the OS of the device 10.

In operation 1102, the controller 110 controls the monitor 111 to monitor use histories of the applications installed in the device 10.

In operation 1103, the controller 110 controls the determiner 112 to determine whether at least one application satisfying the pre-set uninstall condition exists from among the installed applications based on the monitored use histories.

If the at least one application exists, the controller 110 performs operation 1104. However, if the at least one application does not exist, the controller 110 performs operation 1102 to continuously monitor the use histories.

In operation 1104, the controller 110 controls the determiner 112 to determine whether the at least one application is in the first uninstall level based on the monitored use histories.

If the at least one application is at the first uninstall level, the controller 110 performs operation 1105. However, if the at least one application is not at the first uninstall level, the controller 110 performs operation 1106.

In operation 1105, the controller controls the uninstaller 113 to perform the first uninstall operation on the at least one application.

After the first uninstall operation is performed, the controller 110 performs operation 1102 to again continuously monitor the use histories.

In operation 1106, the controller 110 controls the determiner 112 to determine whether the at least one application is in the second uninstall level based on the monitored use histories.

If the at least one application is at the second uninstall level, the controller 110 performs operation 1107. However, if the at least one application is not at the second uninstall level, the controller 110 performs operation 1108.

In operation 1107, the controller 110 controls the uninstaller 113 to perform the second uninstall operation on the at least one application.

After the second uninstall operation is performed, the controller 110 performs operation 1102 to again continuously monitor the use histories.

In operation 1108, the controller 110 controls the determiner 112 to determine whether the at least one application is at the third uninstall level based on the monitored use history.

If the at least one application is at the third uninstall level, the controller 110 performs operation 1109. However, if the at least one application is not at the third uninstall level, the controller 110 performs operation 1102.

In operation 1109, the controller, 110 controls the uninstaller 113 to perform the third uninstall operation on the at least one application.

Meanwhile, in the current exemplary embodiment, it may be assumed that three uninstall levels exist. Thus, after the third uninstall operation is performed, the at least one application is completely deleted from the device 10, and thus, no more uninstall operation is performed. However, as described above, the three uninstall levels are assumed for convenience of description in the current embodiment, and thus, there may be more or less number of uninstall levels by subdividing or combining the first through third uninstall levels described herein.

In operation 1110, if it is determined that there is no application corresponding to an uninstall level in operation 1103, the controller 110 determines whether there is an application whose uninstall level needs to be canceled. In other words, when an uninstall level was applied to an application because a user did not use the application but the user is currently using the application, the uninstall level of the application may need to be released. Accordingly, the controller 110 determines whether to release the uninstall level of the application to which the uninstall level was applied.

If the uninstall level is to be released, the controller 110 performs operation 1111. However, if the uninstall level is not to be released, the controller 110 performs operation 1102.

In operation 1111, the controller 110 cancels the uninstall level of the application determined in operation 1110. Then, the controller 110 performs operation 1102 again.

Figure 12:
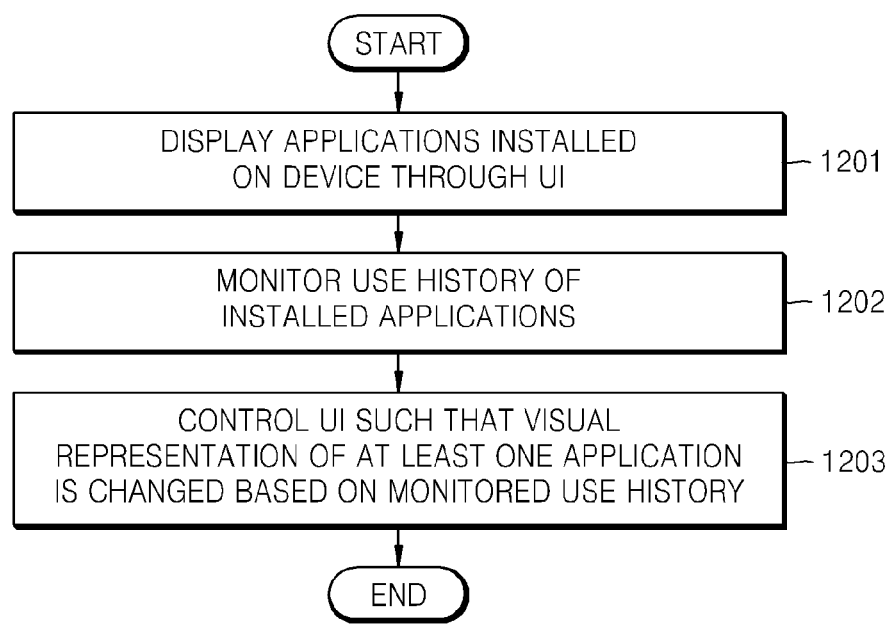
FIG. 12 is a flowchart illustrating a method of managing applications installed on a device, according to another exemplary embodiment.

FIG. 12 is a flowchart illustrating a method of managing applications installed on the device 10, according to another exemplary embodiment. Referring to FIG. 12, the method includes operations performed by the device 10 of FIG. 2 or 8 in time series, and thus, details described above with reference to FIGS. 1A through 8 may also apply to the method of FIG. 12.

In operation 1201, the UI 120 displays the applications installed on the device 10.

In operation 1202, the controller 110 controls the monitor 111 to monitor use histories of the installed applications.

In operation 1203, the controller 110 controls the uninstaller 113 to control the UI 120 such that visual representation of at least one application is changed based on the monitored use histories.

As described above, according to the one or more of the above exemplary embodiments, applications installed on a device, such as a smart phone or a mobile phone, are managed such that a display state of an application that is seldom used or not used at all by a user is changed in stages or data and information related to such an application is deleted in stages, thereby efficiently managing a limited storage capacity of the device or enabling the user to easily manage the applications.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

While one or more exemplary embodiments have been described with reference to the figures, it will be understood by those of ordinary skill in the art that various changes in form and details may be made therein without departing from the spirit and scope as defined by the following claims.

What is claimed is:

1. A device having a plurality of applications installed thereon, the device comprising:
   a display configured to display a plurality of icons, each of the plurality of icons corresponding to each of the plurality of applications; and
   a processor configured to:

monitor use history of each of the plurality of applications, determine an application from among the applications whose monitored use history satisfies a first uninstall level and a second uninstall level based on the monitored use history of the each of the plurality of applications, wherein the first uninstall level is based on a first time period for which an application has not been used, the second uninstall level is based on a second time period for which an application has not been used, and the second time period is greater than the first time period, control the display to change a visual representation of an icon corresponding to the determined application, perform a first uninstall operation corresponding to the first install level when the monitored use history of the application satisfies the first uninstall level, and perform a second uninstall operation corresponding to the second uninstall level on the determined application when the monitored use history of the application satisfies the second uninstall level, wherein the first uninstall operation comprises terminating an automatic update of the determined application, and wherein the second uninstall operation comprises providing a user interface inquiring whether to completely delete the determined application from the device.

2. The device of claim 1, wherein the processor is further configured to change the visual representation of the icon corresponding to the determined application displayed by the display by overlapping a layer of an object representing the icon corresponding to the determined application with a layer of another object.

3. The device of claim 1, wherein the processor is further configured to change the visual representation of the icon corresponding to the determined application displayed by the display by changing an object representing the icon corresponding to the determined application.

4. The device of claim 1, wherein the processor is further configured to control the display to change the visual representation to identify the first uninstall level of the determined application from among the plurality of applications.

5. The device of claim 1, wherein the processor is configured to apply different types of display change conditions according to attributes of the plurality of applications.

6. The device of claim 5, wherein the attributes of the plurality of applications are classified according to at least one of capacities of the plurality of applications,
update frequencies of the plurality of applications,
memory resource capacities occupied by the plurality of applications, and
types of the plurality of applications.

7. The device of claim 1, wherein the processor is further configured to control the display to change the visual representation of the icon corresponding to the determined application by displaying a predetermined symbol overlapped on the icon corresponding to the determined application.

8. The device of claim 1, wherein the display is configured to change the visual representation of the icon corresponding to the determined application by displaying an additional layer showing a predetermined visual effect and overlapped on the icon corresponding to the determined application.

9. The device of claim 8, wherein the additional layer comprises at least one of a layer for differently showing a color, a brightness, a chroma of the icon, a luma of the icon, a layer for showing the icon as darkened, a layer for showing the icon as foggy, a layer for showing the icon in a grayscale, a layer for showing dotted lines on a boundary of the icon, a layer for showing the icon as visually concave, a layer for showing the icon as visually convex, and a layer for applying a visual effect to the icon, wherein the icon corresponds to the determined application.

10. The device of claim 1, wherein the processor is further configured to determine, based on the monitored use history, at least one of an application that has not been used for a predetermined threshold time,
an application that is not used repeatedly a threshold number of times until a predetermined point of time,
an application that is not used when a location of the device is outside a range of a predetermined place, and
an application that has not been commonly used with another device for a threshold time, and
change the visual representation of the icon corresponding to the determined application.

11. The device of claim 1, wherein the processor is further configured to delete user data that is stored in the device while the determined application is used, and backing up the stored user data in a server, with respect to the determined application.

12. A method of managing a plurality of applications installed on a device, the method comprising:

displaying a plurality of icons, each of the plurality of icons corresponding to each of the plurality of applications through a display;

monitoring a use history of each of the applications;

determining an application from among the applications whose monitored use history satisfies a first uninstall level and a second uninstall level based on the monitored use history of the each of the plurality of applications, wherein the first uninstall level is based on a first time period for which an application has not been used, the second uninstall level is based on a second time period for which an application has not been used, and the second time period is greater than the first time period, controlling the display to change a visual representation of an icon corresponding to the determined application; and performing a first uninstall operation corresponding to the first uninstall level when the monitored use history of the application satisfies the first uninstall level, and performing a second uninstall operation corresponding to the second uninstall level on the determined application when the monitored use history of the application satisfies the second uninstall level, wherein the first uninstall operation comprises terminating an automatic update of the determined application, and wherein the second uninstall operation comprises providing a user interface inquiring whether to completely delete the determined application from the device.

13. The method of claim 12, wherein the controlling the display comprises controlling the display such that a layer of an object representing the icon corresponding to the determined application is displayed as overlapping below a layer of another object, or such that the icon corresponding to the determined application itself is changed.

14. The method of claim 12, wherein the controlling the display comprises changing the visual representation of the icon corresponding to the determined application by displaying at least one of a predetermined symbol and an additional layer for showing a predetermined visual effect, the additional layer being overlapped on the icon corresponding to the determined application.

* * * * *